US010125255B2

(12) United States Patent
Cai et al.

(10) Patent No.: US 10,125,255 B2
(45) Date of Patent: Nov. 13, 2018

(54) THERMOPLASTIC ELASTOMER COMPOSITIONS HAVING BIORENEWABLE CONTENT

(71) Applicants: TEKNOR APEX COMPANY, Pawtucket, RI (US); CERESTECH, INC., Montreal (CA)

(72) Inventors: Kevin Cai, Cumberland, RI (US); Yundong Wang, Lancaster, MA (US); Ryszard Brzoskowski, Village of Nagog Woods, MA (US); Prashant A. Bhadane, Houston, TX (US); Basil D. Favis, Kirkland (CA); Alain Perreault, Outremont (CA)

(73) Assignees: TEKNOR APEX COMPANY, Pawtucket, RI (US); CERESTECH, INC., Montreal, Quebec (CA)

( * ) Notice: Subject to any disclaimer, the term of this patent is extended or adjusted under 35 U.S.C. 154(b) by 0 days.

(21) Appl. No.: 15/262,615

(22) Filed: Sep. 12, 2016

(65) Prior Publication Data
US 2016/0376432 A1   Dec. 29, 2016

Related U.S. Application Data

(63) Continuation of application No. 14/047,342, filed on Oct. 7, 2013.

(60) Provisional application No. 61/710,864, filed on Oct. 8, 2012.

(51) Int. Cl.
| C08L 53/00 | (2006.01) |
| C08L 25/08 | (2006.01) |
| C08L 67/04 | (2006.01) |
| C08L 3/00 | (2006.01) |
| C08L 3/02 | (2006.01) |
| C08L 51/00 | (2006.01) |
| C08L 53/02 | (2006.01) |

(52) U.S. Cl.
CPC ............ *C08L 53/00* (2013.01); *C08L 3/00* (2013.01); *C08L 3/02* (2013.01); *C08L 25/08* (2013.01); *C08L 67/04* (2013.01); *C08L 51/006* (2013.01); *C08L 53/025* (2013.01)

(58) Field of Classification Search
CPC ......... C08L 67/04; C08L 53/02; C08L 53/025
See application file for complete search history.

(56) References Cited

U.S. PATENT DOCUMENTS

| 4,357,432 A | 11/1982 | Edwards |
| 5,639,810 A | 6/1997 | Smith, III et al. |
| 5,955,163 A | 9/1999 | White |
| 6,031,053 A | 2/2000 | Knoll et al. |
| 6,054,532 A | 4/2000 | Wang et al. |
| 6,197,889 B1 | 3/2001 | Knoll et al. |
| 6,605,657 B1 | 8/2003 | Favis et al. |
| 6,673,857 B1 | 1/2004 | Knoll et al. |
| 6,844,380 B2 | 1/2005 | Favis et al. |
| 6,984,688 B2 | 1/2006 | Gu |
| 7,169,848 B2 | 1/2007 | Bening et al. |
| 7,267,855 B2 | 9/2007 | Handlin, Jr. et al. |
| 7,585,916 B2 | 9/2009 | Wright et al. |
| 7,625,967 B2 | 12/2009 | St. Clair |
| 7,884,158 B2 | 2/2011 | Bui et al. |
| 8,007,823 B2 | 8/2011 | Favis et al. |
| 8,658,727 B2 | 2/2014 | Date |
| 2003/0100659 A1* | 5/2003 | Tasaka .................. C08L 23/04 524/487 |
| 2004/0138371 A1* | 7/2004 | St. Clair ............ C08F 293/005 524/505 |
| 2005/0197447 A1 | 9/2005 | Gu et al. |
| 2006/0121170 A1 | 6/2006 | Howard |
| 2007/0066753 A1 | 3/2007 | Ehrlich et al. |
| 2008/0085961 A1 | 4/2008 | Lin |
| 2008/0150261 A1 | 6/2008 | Von Tschammer et al. |
| 2008/0171006 A1 | 7/2008 | Bui et al. |
| 2008/0171007 A1 | 7/2008 | Bui |
| 2008/0287592 A1 | 11/2008 | Favis et al. |
| 2010/0063008 A1 | 3/2010 | Matteliano et al. |

(Continued)

FOREIGN PATENT DOCUMENTS

| CA | 2159934 C | 2/2002 |
| EP | 0733677 A1 | 9/1996 |

(Continued)

OTHER PUBLICATIONS

Igura, M., Okazaki, M. and Ohim, M. (2011) Decomposition Characteristics of biodegradable plastics made from sago starch-extraction residue, Journal of Applied Polymer Science, vol. 119, Issue 6, 3 pages.

Hongsheng Liu et al, Thermal processing of starch-based polymers, vol. 34, issue 12, Dec. 2009, 5 pages.

*Primary Examiner* — Brieann R Johnston
(74) *Attorney, Agent, or Firm* — Hudak, Shunk & Farine Co. LPA

(57) ABSTRACT

Thermoplastic elastomer compositions, in particular derived from one or more styrenic block copolymers wherein at least one styrenic block copolymer comprises a controlled distribution copolymer block including a conjugated diene and a mono alkenyl arene, a plurality of biorenewable materials, preferably a softener and one or more synergistic additives such as a polar polymer; a synergistic block copolymer such as a relatively high molecular weight styrenic block copolymer; and/or filler. Numerous desirable articles can be formed from the compositions. Processes for preparing the compositions and articles are disclosed.

18 Claims, 1 Drawing Sheet

(56) References Cited

U.S. PATENT DOCUMENTS

| | | | |
|---|---|---|---|
| 2010/0105836 A1* | 4/2010 | Mawatari | C08L 23/142 525/71 |
| 2010/0190892 A1 | 7/2010 | Binkley | |
| 2010/0298486 A1 | 11/2010 | Lysenko et al. | |
| 2010/0331465 A1 | 12/2010 | Zhao | |
| 2011/0160364 A1 | 6/2011 | Toyohara et al. | |
| 2011/0184082 A1 | 7/2011 | Wright et al. | |
| 2011/0245430 A1 | 10/2011 | Corzani et al. | |
| 2011/0257335 A1 | 10/2011 | Knoll et al. | |
| 2011/0262686 A1 | 10/2011 | Wright et al. | |
| 2011/0263762 A1 | 10/2011 | Matsuno et al. | |
| 2012/0059108 A1 | 3/2012 | Date | |
| 2014/0100310 A1* | 4/2014 | Cai | C08L 3/00 524/52 |
| 2014/0100311 A1* | 4/2014 | Cai | C08L 3/00 524/52 |

FOREIGN PATENT DOCUMENTS

| | | |
|---|---|---|
| EP | 1181333 B1 | 2/2002 |
| JP | 2003080555 | 3/2003 |
| WO | 9207661 A1 | 5/1992 |
| WO | 9211096 A1 | 7/1992 |
| WO | 0148078 A1 | 7/2001 |
| WO | 2006116861 A1 | 11/2006 |
| WO | 2008087675 A1 | 7/2008 |
| WO | 2009150385 A2 | 12/2009 |
| WO | 2009152870 A1 | 12/2009 |
| WO | 2010072595 A1 | 7/2010 |
| WO | 2010126855 A2 | 11/2010 |
| WO | 2010134915 A1 | 11/2010 |
| WO | 2011073308 A1 | 6/2011 |
| WO | 201135927 A1 | 11/2011 |

\* cited by examiner

THERMOPLASTIC ELASTOMER COMPOSITIONS HAVING BIORENEWABLE CONTENT

CROSS REFERENCE

This application is a continuation application of U.S. application Ser. No. 14/047,342, filed on Oct. 7, 2013, which claims the benefit of priority under 35 U.S.C. § 119 of U.S. Provisional Application Ser. No. 61/710,864, filed Oct. 8, 2012 herein fully incorporated by reference.

FIELD OF THE INVENTION

The present invention relates to thermoplastic elastomer compositions, in particular derived from one or more styrenic block copolymers wherein at least one styrenic block copolymer comprises a controlled distribution copolymer block including a conjugated diene and a mono alkenyl arene, a plurality of biorenewable materials, preferably a softener; and one or more synergistic additives such as a polar polymer; a synergistic block copolymer such as a relatively high molecular weight styrenic block copolymer; and/or filler. Numerous desirable articles can be formed from the compositions. Processes for preparing the compositions and articles are disclosed.

BACKGROUND OF THE INVENTION

Thermoplastic elastomer compositions are versatile as they exhibit beneficial elastomeric properties and yet may be processed using standard thermoplastic processing equipment. Numerous different thermoplastic elastomer compositions, some with biorenewable components, have been proposed.

U.S. Patent Application Publication No. 2011/0184082 relates to a composition that includes a hydrogenated styrenic block copolymer that has at least one block A and at least one block B, and about 10 to about 90 percent by weight of an styrene-isobutylene-styrene block copolymer. Each A is an monoalkenyl arene and each B block is a controlled distribution copolymer of at least one mono alkenyl arene and at least one conjugated diene, having the general formula A-EB/A-A and (A-EB/A)nX. Each B block comprises terminal regions adjacent to the A blocks that are rich in conjugated diene units and one or more regions not adjacent to the A blocks that are rich in mono alkenyl arene units. Oil-free compositions that reportedly result in the combination of low gaseous permeability, low thermal conductivity, strong vibration and sound attenuation, and optionally high levels of light transmission with relatively low haze values while maintaining melt flow rates suitable for easy processibility are preferred.

U.S. Patent Application Publication No. 2010/00630008 relates to gelatinous elastomer compositions. In certain embodiments, a gelatinous elastomer composition is disclosed comprising about 1.0% to 50.0% block copolymer, about 0% to 98% mineral and/or synthetic oil, and about 0.0% to 98% triglyceride oil, about 0-15.0% free fatty acids, about 0-30% of a tack modification agent, about 0-20.0% of a biologically active agent and, optionally a phytosterol, ceramide and/or bisabolol. The gelatinous elastomer compositions are reportedly useful for applying a biologically active agent to a mammal. In certain embodiments, the gelatinous elastomer composition is formed into a molded article.

U.S. Patent Application Publication No. 2008/0171007 relates to a method of making up keratinous substrates involving applying onto the keratinous substrates a composition containing a) a block copolymer, b) a tackifier, c) a wax, d) a liquid fatty phase, e) a high viscosity ester, and f) optionally, a colorant.

U.S. Patent Application Publication No. 2008/0171006 relates to a method of making up keratinous substrates involving applying onto the keratinous substrate a composition containing a) a block copolymer, b) a tackifier, c) an alkyl silsesquioxane wax, d) a liquid fatty phase, and e) optionally, a colorant.

U.S. Patent Application Publication No. 2006/0121170 relates to a nonflowable gel composition including a vegetable oil and a thermoplastic elastomer. The nonflowable gel composition is characterized by its inability to flow when subjected to pressure. In another embodiment, the invention is a resilient gel composition which includes a vegetable oil and a thermoplastic elastomer. The resilient gel composition is characterized by its ability to recover its size and form following deformation. In another embodiment, a support surface for supporting the human body is disclosed, including the composition and a holding structure for holding the composition.

U.S. Pat. No. 7,884,158 relates to a cosmetic composition containing at least one block copolymer having a hard segment and a soft segment, at least one tackifier component, at least one phenylated silicone, at least one solvent, and optionally, at least one colorant.

U.S. Pat. No. 7,625,967 relates to oil gel compositions that include at least one non-aromatic ester oil and an anionic block copolymer of a mono alkenyl arene and a conjugated diene. The block copolymer is selectively hydrogenated and has mono alkenyl arene end blocks and a controlled distribution block of a mono alkenyl arene and a conjugated diene midblock. The ester oil is a non-aromatic, ester compound such as soybean oil, rapeseed oil, and other like compounds.

U.S. Pat. No. 7,267,855 relates to articles prepared from anionic block copolymers of mono alkenyl arenes and conjugated dienes, and to blends of such block copolymers with other polymers. The block copolymers are selectively hydrogenated and have mono alkenyl arene end blocks and controlled distribution blocks of mono alkenyl arenes and conjugated dienes. The block copolymer may be blended with at least one other polymer selected from the group consisting of olefin polymers, styrene polymers, amorphous resins and engineering thermoplastic resins.

U.S. Pat. No. 7,169,848 relates to a block copolymer containing a controlled distribution copolymer block of a conjugated diene and a mono alkenyl arene, where the controlled distribution copolymer block has terminal regions that are rich in conjugated diene units and a center region that is rich in mono alkenyl arene units. Also disclosed is a method for manufacture of the block copolymer.

U.S. Pat. No. 6,984,688 relates to a plasticized HSBC blended with polypropylene and free of a filler material which adversely affects clarity, provides an injection-moldable composition for an article required to have specific properties, namely, tensile strength in the range from about 4.13 to 8.96 MPa (600 to 1300 psi); tear strength in the range from about 21 to 52.6 N/mm (120 to 300 lbs/in); softness in the range from about 45 but less than 65 Shore A; and haze less than 20%, measured by ASTM D1003 using a BYK Gardner Micro Tri-gloss 4525 meter; and it is essential that all of these properties, along with the physical dimensions of the molded article, remain substantially unchanged after immersion of the article in boiling water for 1 hour. Such a composition reportedly may be injection molded to form a nipple for feeding an infant, or a teething ring, or goggles for a diver, and the articles are reportedly sterilizable and recyclable.

U.S. Pat. No. 6,673,857 relates to a thermoplastic elastomer composition comprising a) from 5 to 99% by weight of a block copolymer which is composed of hard blocks S made from vinyl aromatic monomers and of one or more random soft blocks B/S made from dienes and from vinyl aromatic monomers, b) from 1 to 95% by weight of a plasticizer with a higher polarity than white oil and with a lower polarity than diisooctyl phthalate, c) from 0 to 50% by weight of a polyolefin, and d) from 0 to 60% by weight of additives, where the total of a) to d) is 100% by weight. The use of the molding compositions to produce flexible or elastic moldings is described, as are the resultant moldings.

U.S. Pat. No. 6,031,053 relates to an elastomeric block copolymer comprising at least one block A having polymerized units of a vinylaromatic monomer and forming a rigid phase and at least one elastomeric block B/A having polymerized units of both vinylaromatic monomers and of a diene and forming a flexible phase, and glass transition temperature Tg of the block A being above 25° C. and that of the block B/A being below 25° C. and the phase volume ratio of block A to block B/A being chosen so that the amount of the rigid phase in the total block copolymer is 1 to 40% by volume and the amount of the diene is less than 50% by weight.

WO 2009/152870 relates to a group of thermoplastic elastomers reportedly with high environmental compatibility and biodegradability. The compositions include styrenic block copolymers, vegetal oils, solid vegetal oil products and at least one styrenic block copolymer modified with maleic anhydride, see claim 1.

WO 2008/087675 relates to a plastification process of thermoplastic elastomers derived from styrenic block copolymers, in which vegetal oils are used as plastifying substances, and thermoplastic elastomers obtained with the said process.

In view of the above it would be desirable to provide a high performance thermoplastic elastomer composition having biorenewable components, in particular at least a softener and/or at least one additional synergistic additive, preferably in a relatively high percentage by total weight in order to improve oil stability, and achieve desirable properties including low gloss, high physical strength, improved melt strength, and suitable melt viscosity range for both molding and extrusion. In reality, the solution is not simple as numerous issues exist that must be addressed, including, but not limited to, providing a relatively low hardness material without sacrificing tensile strength, recoverable high elongations, component compatibility, processability, heat stability, weatherability, and substantially low or no softener or plasticizer bleed-out. Desirably, the properties should be met not only at the room temperature but from −30° C. to 135° C., more typically from −10° C. to 70° C., for about 168 hrs (1 week) for most of the applications. In spite of many disclosures reporting thermoplastic elastomer compositions including biorenewable content, the applicants have discovered oil bleed-out problems and poor heat resistance with many proposed formulations at various temperatures, which limit the commercialization and application of the bio-based thermoplastic elastomer compositions containing vegetable oils and the like.

SUMMARY OF THE INVENTION

In view of the above, it would be desirable to provide a thermoplastic elastomer composition having relatively high biorenewable content yet additionally exhibits sought-after properties, especially excellent elasticity, high physical strength and desirable oil stability, that is, little or no oil bleed-out at various temperatures, depending on article requirements.

Therefore, it is an object of the present invention to provide a composition comprising at least one styrenic block copolymer having a controlled distribution block of a conjugated diene and a mono alkenyl arene, and further one or more and preferably a plurality of biorenewable components comprising a softener, for example an ester group-containing oil, generally a triglyceride; a wax; an ester; an alcohol; an amine, a starch, a thermoplastic starch, and a polar polymer such as polylactic acid (PLA), polyhydroxyalkanoates (PHAs), polyhydroxybutyrate (PHB), polyether-blockamide (PEBA) etc. When starch is included, the mixture may also contain a plasticizer or dispersion aid dedicated for the starch phase for its effective gelatinization and dispersion. The effective plasticizer or dispersion aid can be from a family of polyols, polyglycols, carboxylic acid derivatives, or polyesters.

Yet another object of the present invention is to provide the controlled distribution block with terminal regions that are rich in conjugated diene units and one or more regions that are rich in mono alkenyl arene units, wherein said block surprisingly provides high compatibility and low oil bleeding or leaching with both a biorenewable ester, preferably glyceride-containing component and a biorenewable additive.

Still another object of the present invention is to provide the composition with a fatty-triglyceride, wax, an ester, alcohol, or amine, or a mixture thereof-containing component derived from a vegetable product, wherein vegetable oils or their derivatives, such as partially or fully hydrogenated vegetable oil, are particularly preferred in some embodiments, and a synergistic biorenewable additive comprising one or more of a starch, thermoplastic starch, and polar polymer.

A further object of the present invention is to provide the composition with biorenewable components comprising triglycerides of saturated and unsaturated fatty acids.

An additional object of the present invention is to provide the compositions with relatively low hardness without sacrificing tensile strength low modulus and desirable elongation.

Yet another object of the present invention is to provide a thermoplastic elastomer composition with enhanced biodegradability, due at least in part to the presence of a plurality of biorenewable components. When a composition includes one or more of an ester and a starch, their hydrophilic natures are keys to biodegradability.

Still another object of the present invention is to provide compositions with a relatively high biorenewable component content that can be formed into articles having a soft-grip feel, have a smooth appearance, are dry, and are substantially free of oil leaching.

A further object of the present invention is to provide a thermoplastic elastomer composition that can be processed utilizing standard processing equipment, such as injection molders and extruders.

Another object of the present invention is to provide a thermoplastic elastomer composition including a styrenic block copolymer having a controlled distribution midblock including a mono alkenyl arene and a conjugated diene, wherein the mono alkenyl arene is present in an amount of less than 30% by weight based on the total weight of the block.

An additional object of the present invention includes providing the thermoplastic elastomer composition having the styrenic block copolymer with a controlled distribution polymer block and biorenewable components with other compounds that enhance the properties of the composition, for example, a softener such as mineral oil, a polyolefin, other styrenic block copolymer or a polar polymer such as PLA.

Yet another object of the invention is to provide a thermoplastic elastomer composition including a styrenic block copolymer having a controlled distribution polymer block, a softener, preferably an ester group-containing oil, a functional group containing styrenic block copolymer, one or more of starch and a thermoplastic starch, and glycerin or a glycerin-like component.

Still another object of the invention is to provide a thermoplastic elastomer composition including a styrenic block copolymer having a controlled distribution polymer block, a softener, preferably an ester group-containing oil, and a polar polymer comprising one or more of polylactic acid (PLA), polyhydroxyalkanoates (PHAs), polyhydroxybutyrate (PHB), ethylene vinyl acetate copolymer, polyether-block-amide (PEBA) etc.

Yet another object of the invention is to provide a thermoplastic elastomer composition including a styrenic block copolymer having a controlled distribution polymer block, a softener, preferably an ester group-containing oil, and a relatively high molecular weight styrenic block copolymer such as ultra-high molecular weight SEBS.

Still another object of the invention is to provide a thermoplastic elastomer composition including a styrenic block copolymer having a controlled distribution polymer block, a softener, preferably an ester group-containing oil, a polyolefin, such as polypropylene, and a polar polymer such as described herein.

Still another object of the present invention is to provide a composition including a styrenic block copolymer, and one or more of a starch and a thermoplastic starch with glycerin or a glycerin like component, a natural wax, a fatty ester, a fatty alcohol, a fatty amine, and a polar polymer.

Accordingly, in one aspect, a thermoplastic elastomer composition is disclosed, comprising a styrenic block copolymer comprising at least one controlled distribution copolymer block having a conjugated diene and a mono alkenyl arene; a biorenewable softener comprising a natural ester; at least one synergistic additive comprising one or more of starch, thermoplastic starch, a biorenewable polar polymer, and a high molecular weight styrenic block copolymer.

In a further aspect of the present invention a thermoplastic elastomer composition is disclosed, comprising a styrenic block copolymer comprising at least one controlled distribution copolymer block having a conjugated diene and a mono alkenyl arene; a biorenewable softener comprising an ester-containing oil; one or more of starch and thermoplastic starch in an amount from about 2 parts to about 8 parts by weight, wherein all parts are based on 100 parts by weight of the composition.

DETAILED DESCRIPTION OF THE INVENTION

Figure 1:
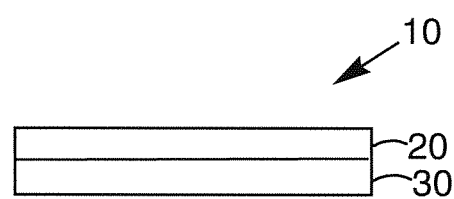
FIG. 1 illustrates a cross-sectional side view of one embodiment of a composite of the present invention including a layer comprising a thermoplastic elastomer composition having biorenewable content.

The thermoplastic elastomer compositions of the present invention include a styrenic block copolymer having a controlled distribution copolymer block having a conjugated diene and a mono alkenyl arene, wherein said block comprises terminal regions adjacent relatively harder blocks, with the controlled distribution block being rich in conjugated dienes adjacent to the relatively hard blocks and one or more regions not adjacent to the relatively hard blocks that are rich in mono alkenyl arene units, and biorenewable components comprising a softener and an additive. Surprisingly, the inventive compositions exhibit lower hardness without sacrificing much tensile strength when compared to combining the styrenic block copolymer having the controlled distribution copolymer block with a mineral oil. Polar components such as starch, PLAs, etc. have also found to help better retain the softener in various formulations. The compositions of the present invention can also include other compounds, for example as described herein.

General Styrenic Block Copolymers

In various embodiments, the compositions of the present invention include one or more styrenic block copolymers, in addition to the styrenic block copolymer having a controlled distribution copolymer block having a conjugated diene and a mono alkenyl arene. In a preferred embodiment, the styrenic block copolymers have a hard block (A) including aromatic vinyl or mono-alkenyl arene repeat units and at least one soft polymer block (B) containing two or more repeat units, that are the same or different, and independently derived from olefin monomers. The styrenic block copolymer can be, for example, a triblock copolymer (A-B-A); or a tetrablock or higher multiblock copolymer. In a preferred embodiment, the styrenic block copolymer is a triblock copolymer (A-B-A) having two hard blocks.

The number average molecular weight and distribution of any type of styrenic block copolymer (SBC) described in this application are measured by gel permeation chromatography (GPC). The SBC is dissolved in a suitable solvent, such as THF, (typically 0.001-0.010 wt. %), and an appropriate quantity is injected into a GPC device. One suitable GPC device is available from Waters of Milford, Mass. as a Waters Breeze Dual Pump LC. The GPC analysis is performed at an appropriate elution rate (1 to 10 mL/min). The molecular weight distribution is characterized by the signals from UV and refractive index detectors, and number average molecular weights are calculated using a calibration curve generated from a series of narrow molecular weight distribution polystyrenes with peak molecular weights of 500 to 1,000,000 as standard.

Each hard polymer block (A) can have two or more same or different aromatic vinyl repeat units. For example, the block copolymer may contain (A) blocks which are styrene/alpha-methylstyrene copolymer blocks or styrene/butadiene random or tapered copolymer blocks so long as a majority of the repeat units of each hard block are aromatic vinyl repeat units. The (A) blocks are aromatic vinyl compound homopolymer blocks in one embodiment. The term "aromatic vinyl" is to include those of the benzene series, such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred aromatic vinyl compounds are monovinyl monocyclic aromatics, such as styrene and alpha-methylstyrene, with styrene being most preferred. When three or more different repeat units are present in hard polymer block (A), the units can be combined in any form, such as random form, block form and tapered form.

Optionally, the hard polymer block (A) can comprise small amounts of structural units derived from other copolymerizable monomers in addition to the structural units derived from the aromatic vinyl compounds. The proportion of the structural units derived from other copolymerizable monomers is desirably 30% by weight or less and preferably 10% by weight or less based on the total weight of the hard polymer block (A). Examples of other copolymerizable monomers include, but are not limited to, 1-butene, pentene, hexene, conjugated dienes such as butadiene or isoprene, methyl vinyl ether, and other monomers.

The soft polymer block (B) of the styrenic block copolymer includes two or more same or different structural units. Soft polymer block (B) can be derived from olefin monomers generally having from 2 to about 12 carbon atoms and can include, for example, ethylene, propylene, butylene, isobutylene, etc. When the soft polymer block (B) has structural units derived from three or more repeat units, the structural units may be combined in any form such as random, tapered, block or any combination thereof. In one embodiment, the soft polymer block does not contain any unsaturated bonds.

In additional embodiments of the present invention, the styrenic block copolymer can have at least one soft polymer block (B) including two or more repeat units that are the same or different, independently derived from one or more of an olefin monomer and a diene monomer. When the diene monomer is present, the styrenic block copolymer is preferably hydrogenated or substantially hydrogenated. The conjugated diene monomers preferably contain from 4 to about 8 carbon atoms with examples including, but not limited to, 1,3-butadiene (butadiene), 2-methyl-1,3-butadiene (isoprene), 2,3-dimethyl-1,3-butadiene, 1,3-pentadiene (piperylene), 1,3-hexadiene, and the like. Therefore, in one embodiment, the soft polymer block (B) can have structural units derived from one or more of an olefin monomers) and diene monomer(s). As indicated hereinabove, when the soft polymer block (B) has structural units derived from three or more repeat units, the structural units may be combined in any form.

The styrenic block copolymers may be prepared utilizing bulk, solution or emulsion or other techniques as known in the art.

Optionally, the soft polymer block (B) can include small amounts of structural units derived from other copolymerizable monomers in addition to the structural units described. In this case, the proportion of the other copolymerizable monomers is generally 30% by weight or less, and preferably 10% by weight or less based on the total weight of the soft polymer block (B) of the styrenic block copolymer. Examples of other copolymerizable monomers include, for example, styrene, p-methylstyrene, α-methylstyrene, and other monomers that can undergo ionic polymerization.

Optionally, the styrenic block copolymer can be a functionalized styrenic block copolymer such as an acid or anhydride functionalized block copolymer, such as prepared by graft reacting an acid moiety or its derivative into the styrenic block copolymer via a free radically initiated reaction. Examples of suitable monomers which may be grafted include unsaturated mono and polycarboxylic acids and anhydrides containing from about 3 to about 10 carbon atoms. Examples of such monomers are fumaric acid, itaconic acid, citraconic acid, acrylic acid, maleic anhydride, itaconic anhydride, and citraconic anhydride, or the like. Suitable functionalized styrenic block copolymers generally contain from about 0.1 to about 10 percent by weight, preferably from about 0.2 to about 5 percent by weight of the grafted monomer, based on the total weight of the styrenic block copolymer. Grafting reactions can be carried out in solution or by melt mixing the base block copolymer and the acid/anhydride monomer in the presence of a free radial initiator, such as known in the art, see for example U.S. Pat. No. 6,653,408, herein fully incorporated by reference. Suitable functionalized block copolymers are available from KRATON Polymers, Kuraray, Asahi-Kasei, BASF and the like.

In various embodiments, the styrenic block copolymers include, but are not limited to, styrene-butadiene-styrene (SBS), styrene-butadiene/butylene-styrene (SBBS), styrene-isoprene-styrene (SIS), styrene-ethylene/propylene-styrene (SEPS), styrene-ethylene/propylene (SEP), styrene-ethylene/butylene-styrene (SEGS), styrene-ethylene/ethylene/propylene-styrene (SEEPS) and styrene-isobutylene-styrene (SIBS).

Styrenic block copolymers are available in the art from sources such as Kraton Polymers of Houston, Tex., as Kraton; Kuraray Co., Ltd. of Tokyo, Japan as SEPTON™ styrenic block copolymers, LCY Chemical Industry Corp, as Globalprene®, and TSRC Corporation of Taiwan as Taipol.

When present, the amount of the one or more styrenic block copolymers utilized in the compositions of the present invention ranges generally from about 1 to about 40 or 45 parts, desirably from about 10 to about 35 parts and preferably from about 10 or 15 to about 30 parts based on 100 parts by weight of the composition.

Controlled Distribution Copolymer Block-Containing Styrenic Block Copolymers

The controlled distribution block-containing styrenic block copolymers utilized in the invention have at least a first block of a mono alkenyl arene, such as styrene, and a second block of a controlled distribution copolymer of diene and mono alkenyl arene. Thus, the block copolymers can be any di- or higher block copolymers. In the case of a di-block copolymer composition copolymer, one block is an alkenyl arene-based block and polymerized therewith is a second block of the controlled distribution copolymer comprising diene and alkenyl arene. Tri-block or higher multi-block copolymers include at least one alkenyl arene-based block and at least one controlled distribution copolymer block comprising diene and alkenyl arene. In one preferred embodiment, the triblock-composition comprises, as end blocks, alkenyl arene-based blocks and a midblock of a controlled distribution copolymer comprising diene and alkenyl arene. Where a tri-block copolymer composition is prepared, the controlled distribution copolymer block can be designated as "B" and the alkenyl arene-based block designated as "A". The A-B-A tri-block compositions can be made by either sequential polymerization or coupling. In one embodiment, in the sequential solution polymerization technique, the mono alkenyl arene is first introduced to produce a relatively hard aromatic-containing block, followed by introduction of the controlled distribution diene and alkenyl arene-containing mixture to form the midblock, and then followed by introduction of the mono alkenyl arene to form the terminal block.

In one embodiment, a method for making a controlled distribution copolymer block-containing styrenic block copolymer is set forth in U.S. Pat. No. 7,169,848 herein incorporated by reference. As utilized herein, "controlled distribution" is defined as referring to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) mono alkenyl arene units; and (3) an overall structure having relatively low blockiness. For the purposes hereof, "rich in" is defined as greater than the average amount, preferably greater than 5% the average amount. Prior to hydrogenation the styrene in the rubber block portion is copolymerized and incorporated in a controlled distribution having terminal regions that are rich in diene units (e.g. butadiene, isoprene, or a mixture thereof) and a center region that is rich in styrene units. Such polymers were hydrogenated under standard conditions such that greater than 95% of the diene double bonds in the rubbery block have been reduced. The process for producing a selectively hydrogenated styrene block copolymer is described in U.S. Pat. No. 7,169,848 to Bening et al.

The styrene blockiness is simply the percentage of blocky styrene to total styrene units:

Blocky %=100 times(Blocky Styrene Units/Total Styrene Units)

Expressed thus, Polymer-Bd-S—(S)n-S-Bd-Polymer, where n is greater than zero is defined to be blocky styrene. For example, if n equals 8 in the example above, then the blockiness index would be 80%. It is preferred that the blockiness index be less than about 40. For some polymers, having styrene contents of ten weight percent to forty weight percent, it is preferred that the blockiness index be less than about 10. In a preferred embodiment of the present invention, the subject controlled distribution copolymer block has two distinct types of regions—conjugated diene rich regions on the end of the block and a mono alkenyl arene rich region near the middle or center of the block. What is desired is a mono alkenyl arene-conjugated diene controlled distribution copolymer block, wherein the proportion of mono alkenyl arene units increases gradually to a maximum near the middle or center of the block and then decreases gradually until the polymer block is fully polymerized.

The alkenyl arene can be styrene, alpha-methylstryene, para-methylstyrene, vinyl toluene, vinylnaphthalene, or para-butyl styrene or mixtures thereof. Of these, styrene is most preferred and is commercially available, and relatively inexpensive, from a variety of manufacturers. The conjugated dienes for use herein comprise 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred.

For the controlled distribution or B block the weight percent of mono alkenyl arene in each B block is between about 10 weight percent and about 75 weight percent, preferably between about 25 weight percent and about 50 weight percent for selectively hydrogenated polymers.

It is preferred that, to ensure significantly elastomeric performance while maintaining desirably high Tg and strength properties, as well as desirable transparency, the tri-block and multi-block polymer's alkenyl arene content is greater than about 20% weight, preferably from about 20% to about 80% weight. This means that essentially all of the remaining content, which is part of the diene/alkenyl arene block, is diene. It is also important to control the molecular weight of the various blocks. For an AB diblock, desired block weights are 3,000 to about 60,000 for the monoalkenyl arene A block, and 30,000 to about 300,000 for the controlled distribution conjugated diene/mono alkenyl arene B block. Preferred ranges are 5,000 to 45,000 for the A block and 50,000 to about 250,000 for the B block. For the triblock, which may be a sequential ABA or coupled (AB)$_2$X block copolymer, the A blocks should be 3,000 to about 60,000 preferably 5,000 to about 45,000, while the B block for the sequential block should be about 30,000 to about 300,000 and the B blocks (two) for the coupled polymer half that amount. The total average molecular weight for the triblock copolymer should be from about 40,000 to about 400,000 and for the radial copolymer from about 60,000 to about 600,000. For the tetrablock copolymer ABAB the block size for the terminal B block should be about 2,000 to about 40,000, and the other blocks may be similar to that of the sequential triblock copolymer. These molecular weights are most accurately determined by light scattering measurements, and are expressed as number average molecular weight.

The controlled distribution block copolymer can be hydrogenated in various embodiments. One preferred hydrogenation is selective hydrogenation of the diene portions of the final block copolymer alternatively both the "B" blocks and the "A" blocks may be hydrogenated, or merely a portion of the "B" blocks may be hydrogenated.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Re. No. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A, AND III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. Such exhaustive hydrogenation is usually achieved at higher temperatures. In that case, the double bonds of both the conjugated diene and arene may be reduced by 90 percent or more.

In an alternative, the block copolymer of the present invention may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in Gergen et al, U.S. Pat. No. 4,578,429 and in U.S. Pat. No. 5,506,299. In another manner, the selectively hydrogenated block copolymer of the present invention may be functionalized by grafting silicon or boron containing compounds to the polymer as taught in U.S. Pat. No. 4,882,384. In still another manner, the block copolymer of the present invention may be contacted with an alkoxy-silane compound to form silane-modified block copolymer. In yet another manner, the block copolymer of the present invention may be functionalized by grafting at least one ethylene oxide molecule to the polymer as taught in U.S. Pat. No. 4,898,914, or by reacting the polymer with carbon dioxide as taught in U.S. Pat. No. 4,970,265. Still further, the block copolymers of the present invention may be metallated as taught in U.S. Pat. Nos. 5,206,300 and 5,276,101, wherein the polymer is contacted with an alkali metal alkyl, such as a lithium alkyl. And still further, the block copolymers of the present invention may be functionalized by grafting sulfonic groups to the polymer as taught in U.S. Pat. No. 5,516,831. All of the patents mentioned in this paragraph are incorporated by reference into this application.

In various embodiments of the invention, the mono alkenyl arene is present in a total weight in an amount of greater than 20% and preferably greater than 35% based on the total weight of the controlled distribution block copolymer. In various embodiments the soft or B block of the controlled distribution copolymer block has a mono alkenyl arene content of less than 30%, desirably less than 29% by weight. The controlled distribution block copolymer of the present invention may include the copolymers sold under the trade name Kraton A ® by Kraton Polymers, Kraton A1536 and A1535 are examples.

In various embodiments of the invention, the controlled distribution block-containing styrenic block copolymers are utilized in compositions of the present invention in an amount from about 5 to about 90 parts, desirably from about 10 or about 15 to about 70 or 80 parts, and preferably from about 20 to about 30 or 35 parts based on 100 parts by weight of the composition.

High Molecular Weight Styrenic Block Copolymers.

In some embodiments of the present invention, the compositions include one or more relatively high molecular weight styrenic block copolymers. High molecular weight as utilized herein refers to those block copolymers having a number average molecular weight generally greater than 300,000 g/mol. The high molecular weight styrenic block copolymers have been found to reduce gloss, improve physical strength and elasticity, increase melt strength, improve processibility, especially in extrusion applications, and to reduce softener or vegetable oil bleeding in various compositions of the present invention including biorenewable content.

In one embodiment, tri-block styrenic block copolymers are preferred with the copolymers having styrene end blocks with average block length greater than 50,000 and a butadiene mid-block greater than 200,000. Such copolymers can be made from sequential anionic living polymerization. In one embodiment, the high molecular weight styrenic block copolymers are substantially fully hydrogenated. High molecular weight styrenic block copolymers are available from Kraton as Kraton 1633, Kuraray as Septon 4099 and TSRC as Taipol 6159.

When present in a composition of the present invention, the high molecular weight styrenic block copolymer is utilized in an amount generally from about 1 to about 30, desirably from about 2 to about 20 and preferably from about 3 to about 15 parts by weight based on 100 total parts by weight of the composition.

Biorenewable Components

The composition of the present invention includes at least one or at least two biorenewable components, preferably at least one biorenewable softener and at least one biorenewable additive in various embodiments.

A) Softener

As indicated hereinabove, one of the biorenewable components is a softener preferably an oil, e.g. natural oil, such as an ester group-containing oil, such as a monoester, diester, or triester. As defined in the art, an ester comprises the formula R—COO—$R^1$, wherein R is hydrogen or a hydrocarbyl and $R^1$ is a hydrocarbyl, e.g. an alkyl, aryl, or alkyl aryl, each optionally substituted.

In one preferred embodiment, the biorenewable softener component comprises a glyceride or acylglycerol, i.e. a monoglyceride, diglyceride, triglyceride, or combination thereof. Many naturally occurring fats and oils are the fatty acid esters of glycerol. Triglycerides are preferred in one embodiment. The glycerides can be saturated or unsaturated or a combination thereof. The styrenic block copolymers having a controlled distribution copolymer block including a conjugated diene and a mono alkenyl arene are less polar than a styrenic block copolymer containing a random conjugated diene and mono alkenyl arene block. Thus, it is expected that such block copolymers are miscible with standard mineral or white oil. However, it was surprisingly discovered that such controlled distribution copolymer block-containing styrenic block copolymers can be formulated with relatively high amounts of biorenewable softeners.

One or more esters can be employed in the present invention. In a preferred embodiment at least one ester utilized is biorenewable. Suitable esters that can be employed in the present invention include those of the following formulas:

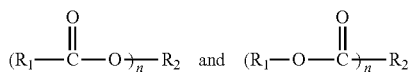

where n has any value from 1 to about 8, and $R_1$ and $R_2$ are the same or different and are hydrogen or a hydrocarbyl (including substituted hydrocarbyls) provided the ester is compatible in the compositions of the invention. It is noted that a suitable group for $R_2$ depends on the value of n.

In one embodiment of the present invention, n is 1, and the ester has the formula $R_1C(O)OR_2$ where $R_1$ is a $C_{10}$-$C_{22}$, preferably a $C_{15}$-$C_{22}$, alkyl, and $R_2$ is a lower alkyl radical containing from 1 to 22 carbon atoms. $R_1$ is preferably $C_{13}$ or more when SEEPS is present in a composition.

Another class of suitable esters that may be employed in the present invention is represented by the following formula:

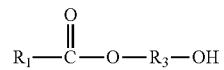

where $R_1$ is defined above and $R_3$ includes alkylene or substituted alkylene.

Still another class of suitable esters that may be employed in the present invention is represented by the following formula:

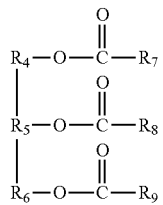

where $R_4$, $R_5$, and $R_6$ individually include alkylene or substituted alkylene; and $R_7$, $R_8$, and $R_9$ individually include hydrogen or a hydrocarbyl.

Suitable esters of the type mentioned above are eicosyl erucate ester or a $C_{12-15}$ alkyl octanoate. Examples of other suitable esters include, but are not limited to: acetylline methylsilanol mannuronate; acetaminosalol; acetylated cetyl hydroxyprolinate; acetylated glycol stearate; acetylated sucrose distearate; acetylmethionyl methylsilanol elastinate; acetyl tributyl citrate; acetyl triethyl citrate; acetyl trihexyl citrate; *aleurites moluccana* ethyl ester; allethrins; allyl caproate; amyl acetate; arachidyl behenate; arachidyl glycol isostearate; arachidyl propionate; ascorbyl dipalmitate; ascorbyl palmitate; ascorbyl stearate; aspartame; batyl isostearate; batyl stearate; bean palmitate; behenyl beeswax; behenyl behenate; behenyl erucate; behenyl isostearate; behenyl/isostearyl beeswax; *borago officinalis* ethyl ester; butoxyethyl acetate; butoxyethyl nicotinate; butoxyethyl stearate; butyl acetate; butyl acetyl ricinoleate; 2-t-butylcyclohexyl acetate; butylene glycol dicaprylate/dicaprate; butylene glycol montanate; butyl ester of ethylene/MA copolymer; butyl ester of PVNI copolymer; butylglucoside caprate; butyl isostearate; butyl lactate; butyl methacrylate; butyl myristate; butyloctyl beeswax; butyloctyl candelillate; butyloctyl oleate; butyl oleate; butyl PABA; butylparaben; butyl stearate; butyl thioglycolate; butyroyl trihexyl citrate; $C_{18-36}$ acid glycol ester; $C_{12-20}$ acid PEG-8 ester; calcium stearoyl lactylate; $C_{18-28}$ alkyl acetate; $C_{18-38}$ alkyl beeswax; $C_{30-50}$ alkyl beeswax; $C_{20-40}$ alkyl behenate; $C_{18-38}$ alkyl $C_{24-64}$ acid ester; $C_8$ alkyl ethyl phosphate; $C_{18-38}$ alkyl hydroxystearoyl stearate; $C_{12-13}$alkyl lactate; $C_{12-15}$ alkyl lactate; $C_{12-13}$ alkyl octanoate; $C_{12-15}$ alkyl octanoate; $C_{18-36}$ alkyl stearate; $C_{20-40}$ alkyl stearate; $C_{30-50}$ alkylstearate; $C_{40-60}$ alkyl stearate; caproyl ethyl glucoside; caprylyl butyrate; $C_{10-30}$ cholesterol/lanoster-ol esters; cellulose acetate; cellulose acetate butyrate; cellulose acetate propionate; cellulose acetate propionate carboxylate; Ceteareth-7 stearate; cetearyl behenate; cetearyl candelillate; cetearyl isononanoate; cetearyl octanoate; cetearyl palmitate; cetearyl stearate; cetyl acetate; acetyl ricinoleate; cetyl caprylate; cetyl $C_{12-15}$ Parath-9 carboxylate; cetyl glycol isostearate; cetyl isononanoate; cetyl lactate; cetyl laurate; cetyl myristate; cetyl octanoate; cetyl oleate; cetyl palmitalte; cetyl RCA; cetyl PPG-2 lsodeceth-7 carboxylate; cetyl ricinoleate; cetyl stearate; $C_{16-20}$ glycol isostearate; $C_{20-30}$ glycol isostearate; $C_{14-16}$ glycol palmitate; chimyl isostearate; chimyl stearate; cholesteryl acetate; cholesteryl/behenyl/ octyldecyl lauroyl glutamate; cholesteryl butyrate; cinoxate; citronellyl acetate; coco-caprylate/caprate; coco rapeseedate; cocoyl ethyl glucoside; *corylus avellana* ethyl ester; $C_{12-15}$ Pareth-9 hydrogenated tallowate; $C_{11-15}$ Pareth-3 oleate; $C_{12-15}$ Pareth-12 oleate; $C_{11-15}$ Pareth-3 stearate; $C_{11-15}$ Pareth-12 stearate; decyl isostearate; decyl myristate; decyl oleate; decyl succinate; DEDM hydantoin dilaurate; dextrin behenate; dextrin laurate; dextrin myristate; dextrin palmitate; dextrin stearate; diacetin; dibutyl adipate; dibutyl oxalate; dibutyl sebacate; di-$C_{12-15}$ alkyl adipate; di-$C_{12-15}$ alkyl fumarate; di-$C_{12-13}$ alkyl malate; di-$C_{12-13}$ alkyl tartrate; di-$C_{14-15}$ alkyl tartrate; dicapryl adipate; dicaprylyl maleate; dicetearyl dimer dilinoleate; dicetyl adipate; dicetyl thiodipropionate; dicocoyl pentaerythrilyl distearyl citrate; diethoxyethyl succinate; diethyl acetyl aspartate; diethylaminoethyl cocoate; diethylaminoethyl PEG-5 cocoate; diethylaminoethyl PEG-5 laurate; diethylaminoethyl stearate; diethyl aspartate; diethylene glycol diisononanoate; diethylene glycol dioctanoate; diethylene glycol dioctanoate/diisononanoate; diethyl glutamate; diethyl oxalate; diethyl palmitoyl aspartate; diethyl sebacate; diethyl succinate; digalloyl trioleate; diglyceryl stearate malate; dihexyl adipate; dihexyldecyl lauroyl glutamate; dihydroabietyl behenate; dihydroabietyl methacrylate; dihydrocholesteryl butyrate; dihydrocholesteryl isostearate; dihydrocholesteryl macadamiate; dihydrocholesteryl nonanoate; dihydrocholesteryl octyldecanoate; dihydrocholesteryl oleate; dihydrophytosteryl octyldecanoate; dihydroxyethylamino hydroxypropyl oleate; dihydroxyethyl soyamine dioleate; diisobutyl adipate; diisobutyl oxalate; diisocetyl adipate; diisodecyl adipate; diisopropyl adipate; diisopropyl dimer dilinoleate; diisopropyl oxalate; diisopropyl sebacate; diisostearamidopropyl epoxypropylmonium chloride; diisostearyl adipate; diisostearyl dimer dilinoleate; diisostearyl fumarate; diisostearyl glutarate; diisostearyl malte; dilaureth-7 citrate; dilauryl thiodipropionate; dimethicone copolyol acetate; dimethicone copolyol adipate; dimethicone copolyol almondate; dimethicone copolyol beeswax; dimethicone copolyol behenate; dimethicone copolyol borageate; dimethicone copolyol cocoa butterate; dimethiccne copolyol dhupa butterate; dimethicone copolyol hydroxystearate; dimethicone copolyol isostearate; dimethicone copolyol kokum butterate; dimethicone copolyol lactate; dimethicone copolyol laurate; dimethicone copolyol mango butterate; dimethicone copolyol meadowfoamate; dimethicone copolyol mohwa butterate; dimethicone copolyol octyldodecyl citrate; dimethicone copolyol olivate; dimethicone copolyol sal butterate; dimethicone copolyol shea butterate; dimethicone copolyol stearate; dimethicone copoly undecylenate; dimethiconol beeswax; dimethiconol behenate; dimethiconol borageate; dimethiconol dhupa butterate; dimethiconol fluoroalcohol dillnoleic acid; dimethiconol hydroxystearate; dimethiconol illipe butterate; dimethiconol isostearate; dimethiconol kokum butterate; dimethiconol lactate; di methiconol mohwa butterate; dimethiconol sal butterate; dimethiconol stearate; dimethyl adipate; dimethylaminoethyl methacrylate; dimethyl brassylate; dimethyl cystinate; dimethyl glutarate; dimethyl maleate; dimethyl oxalate; dimethyl succinate; dimyristyl tartrate; dimyristyl thiodipropionate; dinonoxynol-9 citrate; dioctyl adipate; dioctyl butamido triazone; dioctyl dimer dilinoleate; dioctyldodeceth-2 lauroyl glutamate; dioctyldodecyl adipate; dioctyldodecyl dimer dilinoleate; dioctyldodecyl dodecanedioate; dioctyldodecyl fluoroheptyl citrate; dioctyldodecyl lauroyl glutamate; dioctyldodecyl stearoyl dimer dilinoleate; dioctydodecyl stearoyl glutamate; diocty fumarate; dioctyl malate; dioctyl maleate; dioctyl sebacate; dioctyl succinate; dioleoyl edetolmonium methosulfate; dipalmitoyl hydroxyproline; dipentaerythrityl hexacaprylate/hexacaprate; dipentaerythrityl hexaheptanoate/hexacaprylate/hexacaprate; dipentaerythrityl hexahydroxystearate;

dipentaerythrityl hexahydroxystearate/stearate/rosinate; dipentaerythrityl hexaoctanoate/behenate; dipentaerythrityl pentahydroxystearate/isostearat-e; dipropyl adipate; dipropylene glycol caprylate; dipropylene dipropyl oxalate; disodium laureth-7 citrate; disodium PEG-5 laurylcitrate sulfosuccinate; disodium PEG-8 ricinosuccinate; disodium succinoyl glycyrrhetinate; disodium 2-sulfolaurate; disteareth-2 lauroyl glutamate; disteareth-5 lauroyl glutamate; distearyl thiodipropionate; ditallowoylethyl hydroxyethylmonium methosulfate; ditridecyl adipate; ditridecyl dimer dilinoleate; ditridecyl thiodipropionate; dodecyl gallate; erucyl arachidate; erucyl erucate; erucyl oleate; ethiodized oil; ethoxydiglycol acetate; ethoxyethanol acetate; ethyl almondate; ethyl apricot kemelate; ethyl arachidonate; ethyl aspartate; ethyl avocadate; ethyl biotinate; ethyl butylacetylaminopropionate; ethyl cyanoacrylate; ethyl cycolhexyl propionate; ethyl digydroxypropyl paba; ethylene brassylate; ethylene carbonate; ethy ester of hydrolyzed animal protein; ethyl ester of hydrolyzed keratin; ethyl ester of hydrolyzed silk; ethyl ester of pvm/ma copolymer; ethyl ferulate; ethyl glutamate; ethyl isostearate; ethyl lactate; ethyl laurate; ethyl linoleate; ethyl linolenate; ethyl niethacrylate; ethyl methylphenylglycidate; ethyl minkate; ethyl morrhuate; ethyl myristate; ethyl nicotinate; ethyl oleate; ethyl olivate; ethyl paba ethyl palmitate; ethylparaben; ethyl pelargonate; ethyl persate; ethyl phenylacetate; ethyl ricinoleate; ethyl serinate; ethyl stearate; ethyl thioglycolate; ethyl urocanate; ethyl wheat germate; ethyl ximenynate; Itocrylene; famesyl acetate; galactonolactone; galbanum (ferula galbaniflua) oil; gamrnma-nonalacione; geranyl acetate; glucarolactone; glucose glutamate; glucose pentaacetate; glucuronolactone; glycereth-7 diisononanoate; glycereth-8 hydroxystearate; glycereth-5 lactate; glycereth-25 PCA isostearate; glycereth-7 triacetate; glyceryl triacetyl hydroxystearate; glyceryl triacetyl ricinoleate; glycolamide stearate; glycol/butylene glycol montanate; glycol catearate; glycol dibehenate; glycol dilaurate; glycol dioctanoate; glycol dioleate; glycol distearate; glycol ditallowate; glycol hydroxystearate; glycol montanate; glycol octanoate; glycol oleate; glycol palmitate; glycol ricinoleate; glycol stearate; glycol stearate SE; glycyrrhetinyl stearate; hexacosyl glycol isostearate; hexanediol beeswax; hexanediol distearate; hexanetriol beeswax; hexyldecyl ester of hydrolyzed collagen; hexyldecyl isostearate; hexyldecyl laurate; hexyldecyl octanoate; hexyldecyl oleate; hexyldecyl palmitate; hexyldecyl stearate; hexyl isostearate; hexyl laurate; hexyl nicotinate; homosalate; hydrogenated castor oil hydroxystearate; hydrogenated castor oil isostearate; hydrogenated castor oil lauirate; hydrogenated castor oil stearate; hydrogenated castor oil triisostearate; hydrogenated methyl abietate; hydrogenated rosin; hydroquinone pca; hydroxycetyl isostearate; hydroxyoctacosanyl hydroxystearate; inositol hexa-pca; iodopropynyl butylcarbamate; isoamyl acetate; isoamyl laurate; isobutylated lanolin oil; isobutyl myristate; isobutyl palmitate; isobutylparaben; isobutyl pelargonate; isobutyl stearate; isobutyl tallowate; isoceteareth-8 stearate; isoceteth-10 stearate; isocetyl behenate; isocetyl isodecanoate; isocetyl isostearate; isocetyl laurate; isocetyl linoleoyl stearate; isocetyl myristate: isocetyl octanoate; isocetyl palmitate; isocetyl stearate; isocetyl stearoyl stearate; isodeceth-2 cocoate; isodecyl citrate; isodecyl cocoate; isodecyl hydroxystearate; isodecyl isononanoale; isodecyl laurate; isodecyl myristate; isodecyl neopentanoate; isodecyl octanoate; isodecyl oleate; isodecyl palmitate; isodecylparaben; isodecyl stearate; isohexyl laurate; isohexyl neopentanoate; isohexyl palmitate; isolauryl behenate; isomerized jojoba oil; isononyl ferulate; isooctyl thioglycolate; isopropyl arachidate; isopropyl avocadate; isopropyl behenate; isopropyl citrate; isopropyl $C_{12-15}$-pareth-9 carboxylate; isopropyl hydroxystearate; isopropyl isostearate; isopropyl jojobate; isopropyl lanolate; isopropyl laurate; isopropyl linoleate; isopropyl myristate; isopropyl oleate; isopropylparaben; isopropyl PPG-2-isodeceth-7 carboxylate; isopropyl ricinoleate; isopropyl sorbate; isopropyl stearate; isopropyl tallowate; isopropyl thioglycolate; isosorbide laurate; isosteareth-10 stearate; isostearyl avocadate; isostearyl behenate; isostearyl erucate; isostearyl isononanoate; iscstearyl isostearate; isostearyl isostearoyl stearate; isostearyl lactate; isostearyl laurate; isostearyl myristate; isostearyl neopentanoate; isostearyl octanoate; isostearyl palmitate; isostearyl stearoyl stearate; isotridecyl isononanoate; isotridecyl laurate; isotridecyl myristate; jojoba (buxus chinensis) oil; jojoba esters; kojic dipalmitate; laneth-9 acetate; laneth-10 acetate; laneth-4 phosphate; lanolin linoleate; lanolin ricinoleate; laureth-2 acetate; laureth-6 citrate; laureth-7 citrate; laureth-2 octanoate; laureth-7 tartrate; lauroyl ethyl glucoside; lauroyl lactylic acid; lauryl behenate; lauryl cocoate; lauryl isostearate; lauryl lactate; lauryl methacrylate; lauryl myristate; lauryl octanoate; lauryl oleate; lauryl palmitate; lauryl stearate; linalyl acetate; linoleyl lactate; madecassicoside; mannitan laurate; mannitan oleate; menthyl acetate; menthyl anthranilate; menthyl lactate; menthyl pca; methoxyisopropyl acetate; methoxy-PEG-7 rutinyl succinate; methyl acetyl ricinoleate; methyl anthranilate; methyl behenate; methyl caproate; methyl caprylate; methyl caprylate/caprate; methyl cocoate; 6-methyl coumarin; methyl dehydroabietate; methyl dihydroabietate; methyldihydrojasmonate; methyl glucose dioleate; methyl glucose isostearate; methyl glucose laurale; methyl glucose sesquicaprylate/sesquicaprate; methyl glucose sesquicocoate; methyl glucose sesquiisostearate; methyl glucose sesquilaurate; methyl glucose sesquioleate; methyl glucose sesquistearate; methyl glycyrrhizate; methyl hydrogenated rosinate; methyl hydroxystearate; methyl isostearate; methyl laurate; methyl linoleate; methyl 3-methylresorcylate; methyl myristate; methyl nicotinate; methyl oleate; methyl palmate; methyl palmitate; methylparaben; methyl pelargonate; methyl ricinoleate; methyl rosinate; methylsilanol acetylmethionate; methylsilaiaol carboxymethyl theophylline; methylsilanol carboxymethyl theophylline alginate; methylsilanol hydroxyproline; methylsilanol hydroxyproline aspartate; methylsilanol mannuronate; methylsilanol pca; methyl soyate; methyl stearate; methyl thioglycolate; monosaccharide lactate condensata; myreth-3 caprate; myreth-3 laurate; myreth-2 myristate; myreth-3 myristate; myreth-3 octanoate; myreth-3 palmitate; myristoyl ethyl glucoside; myristoyl lactylic acid; myristyl isostearate; myristyl lactate; myristyl lignocerate; myristyl myristate; myristyl octanoate; myristyl propionate; myristyl stearate; neopentyl glycol dicaprate; neopentyl glycol dicaprylate/dicaprate; neopentyl glycol dicaprylate/dipelargonate/dicaprate; neopentyl glycol diheptanoate; neopentyl glycol diisostearate; neopentyl glycol dilaurate; neopentyl glycol dioctanoate; nonyl acetate; nopyl acetate; octacosanyl glycol isostearate; octocrylene; octyl acetoxystearate; octyl caprylate/caprate; octyl cocoate; octyldecyl oleate; octyldodecyl behenate; octyldodecyl erucate; octyldodecyl hydroxystearate; octyldodecyl isostearate; octyldodecyl lactate; octyldodecyl lanolate; octyldodecyl meadowfoamate; octyldodecyl myristate; octyldodecyl neodecanoate; octyldodecyl neopentanoate; octyldodecyl octanoate; octyldodecyl octyldodecanoate; octyldodecyl oleate; octyldodecyl olivate; octyldodecyl ricinoleate; octyldodecyl stearate; octyldodecyl steroyl stearate; octyl gallate; octyl hydroxystearate; octyl isononanoate; octyl isopalmitate; octyl isostearate; octyl laurate; octyl linoleayl stearate; octyl myristate; octyl neopentanoate; octyl octanoate; octyl oleate; octyl palmitate; octyl PCA; octyl pelagonate; octyl stearate; oleoyl ethyl glucoside; oleyl acetate; oleyl arachidate; oleyl erucate; oleyl ethyl phosphate; oleyl lactate; oleyl lanolate; oleyl linoleate; oleyl myristate; oleyl oleate; oleyl phosphate; oleyl stearate; oryzanol; ozonized jojoba oil; palmitoyl carniline; palmitoyl inulin; palmitoyl myristyl serinate; pantethine; panthenyl ethyl ester acetate; panthenyl triacetate; pca glyceryl oleate; pea palmitate; PEG-18 castor oil dioleate; PEG-5 DMDM hydantoin oleate; PEG-15 dmdm hydantoin stearate; PEG-30 dipolyhydroxystearate; PEG-20 hydrogenated castor oil isostearate; PEG-50 hydrogenated castor oil isostearate; PEG-20 hydrogenated castor oil tri-isostearate; PEG-20 mannitan laurate; PEG-20 methyl glucose distearate; PEG-80 methyl glucose laurate; PEG-20 methyl glucose sesquicaprylate/sescquicaprate; PEG-20 methyl glucose sesquilaurate; PEG-5 oleamide dioleate; PEG-150 pentaerythrityl tetrastearate; PEG-3/PPG-2 glyceryl/sorbitol hydroxystearate/isostearate; PEG-4 proline linoleate; PEG-4 proline linolenate; PEG-8 propylene glycol cocoate; PEG-55 propylene glycol oleate; PEG-25 propylene glycol stearate; PEG-75 propylene glycol stearate; PEG-120 propylene glycol stearate; PEG40 sorbitol hexaoleate; PEG-50 sorbitol hexaoleate; PEG-30 sorbitol tetraoleate laurate; PEG-60 sorbitol tetrastearate; PEG-5 tricapryl citrate; PEG-5 tricetyl citrate; PEG-5 trilauryl citrate; PEG-5 trimethylolpropane trimyristate; PEG-5 trimyristyl citrate; PEG-5 tristeaiyl citrate; PEG-6 undecylenate; pentadecalacione; pentaerythrityl dioleate; pentaerythrityl distearate; pentaerythrityl hydrogenated rosinate; pentaerythrityl isostearate/caprate/caprylate/adipate; pentaerythrityl rosinate; pentaerythrityl stearate; pentaerythrityl stearate/caprate/caprylate/adipate; pentaerythrityl stearate/Isostearate/adipate/hydroxystearate; pentaerythrityl tetraabietate; pentaerythrityl tetraacetate; pentaerityl tetrabehenate; petaerythrityl tetracaprylate/tetracaprate; pentaerythrityl tetracocoate; pentaerythrityl tetraisononanoate; pentaerythrityl tetralaurate; pentaerythrityl tetramyristate; pentaerythrityl tetraoctanoate; pentaerythrityl tetraoleate; pentaerythrityl tetrapelargonate; petaerythrityl tetrastearate; pentaerythrityl trioleate; phenoxyethylparaben; phylosteryl macadamiate; potassium butylparaben; potassium deceth-4 phosphate; potassium ethylparaben; potassiuim methylparaben; potassium propylparaben; PPG-2 isoceleth-20 acetate; PPG-14 laureth-60 alkyl dicarbamate; PPG-20 methyl glucose ether acetate; PPG-20 methyl glucose ether distearate; PPG-2 myristyl ether propionate; PPG-14 palmeth-60 alkyl dicarbamate; pregnenolone acetate; propylene glycol alginate; propylene glycol behenate; propylene glycol caprylate; propylene glycol Ceteth-3 acetate; propylene glycol Ceteth-3 propionate; propylene glycol citrate; propylene glycol cocoate; propylene glycol dicaprate; propylene glycol dicaproate; propylene glycol dicaprylate; propylene glycol dicocoate; propylene glycol diisononanoate; propylene glycol diisostearate; propylene glycol dilaurate; propylene glycol dioctanoate; propylene glycol dioleate; propylene glycol dipelargonate; propylene glycol distearate; propylene glycol diundecanoate; propylene glycol hydroxystearate; propylene glycolisoceteth-3 acetate; propylene glycol isostearate; propylene glycol laurate; propylene glycol linoleate; propylene glycol linolenate; propylene glycol myristate; propylene glycol myristyl ether acetate; propylene glycol oleate; propylene glycol oleate se; propylene glycol ricinoleate; propylene glycol soyate; propylene glycol stearate; propylene glycol stearate se; propyl gallate; propylparaben; pyricarbate; pyridoxine dicaprylate; pyridoxine dilaurate; pyridoxine dioctenoate; pyridoxine dipalmitate; pyridoxine glycyrrhetinate; pyridoxine tripalmitate; raffmose myristate; raffinose oleate; resorcinol acetate; retinyl acetate; retinyl linoleate; retinyl palmitate; retinyl propionate; riboflavin tetraacetate; ribonolaclone; siloxanetriol phytate; silybum marianum ethyl ester; sodium behenoyl lactylate; sodium butylparaben; sodium caproyl lactylate; sodiumn cocoyl lactylate; sodium dilaureth-7 citrate; sodium ethylparaben; sodium ethyl 2-sulfolaurate; sodium isostearoyl lactylate; sodium laureth-7 tartrate; sodium lauroyl lectylate; sodium methylparaben; sodium methyl 2-sulfolaurate; sodium oleoyl lactylate; sodium panteheine sulfonate; sodium phytate; sodium propylparaben; sodium stearoyl lactylate; sorbeth-2 cocoate; sorbeth-6 hexastearate; sorbeth-3 isostearate; sorbityl acetate; soybean palmitate; soy sterol acetate; stearamide dea-distearate; stearamide diba-stearate; stearamide mea-stearate; steareth-5 stearate; stearoyl lactylic acid; stearyl acetate; stearyl acetyl glutamate; stearyl beeswax; stearyl behenate; stearyl caprylate; stearyl citrate; stearyl erucate; stearyl glycol isostearate; stearyl glycyrrhetinate; stearyl heptanoate; stearyl lactate; stearyl linoleate; stearyl octanoate; stearyl stearalte; stearyl stearoyl stearate; sucrose cocoate; sucrose dilaurate; sucrose distearate; sucrose laurate; sucrose myristate; sucrose octaacetate; sucrose oleate; sucrose palmitate; sucrose polybehenate; sucrose polycottonseedate; sucrose polylaurate; sucrose polylinoleate; sucrose polypalmate; sucrose polysoyate; sucrose polystearate; sucrose ricinoleate; sucrose stearate; sucrose tetrastearate triacetate; sucrose tribehenate; sucrose tristearate; tallowoyl ethyl glucoside; tannic acid; TEA-lauroyl lactylate; telmesteine; terpineol acetate; tetradecyleicosyl stearate; tetrahexyldecyl ascorbate; tetrahydrofurfuryl ricinoleate; tocophersolan; tocopheryl acetate; tocopheryl linoleate; tocopheryl linoleate/oleate; tocopheryl nicotinate; tocopheryl succinate; tributyl citrate; tri-$C_{12-13}$ alkyl citrate; tri-$C_{14-15}$ alkyl citrate; tricaprylyl citrate; tridecyl behenate; tridecyl cocoate; tridec), erucate; tridecyl isononanoate; tridecyl laurate; tridecyl myristate; tridecyl neopentanoate; tfridecyl octanoate; tridecyl stearate; tridecyl stearoyl stearate; tridecyl trimellitate; triethylene glycol hydrogenated rosinate; trihexyldecyl citrate; triisocetyl citrate; triisopropyl trilinoleate; triisostearyl citrate; triisostearyl trilinoleate; trilactin; trilauryl citrate; trimethylolpropane tricaprylate/tricaprate; trimethylolpropane tricocoate; trimethylolpropane trilaurate; trimethylalpropane trioctanoate; trimethylolpropane tristearate; trimethyl pentanyl diisobutyrate; trioctyl citrate; trioctyldodecyl borate; trictyl trimellitate; trioleyl citrate; tripaba panthenol; tripropylene glycol citrate; tristearyl citrate; tristearyl phosphate; and yeast palmitate.

In a preferred embodiment, the ester-containing oils are natural product oils that are typically found in animal or plant tissues, including those which have been hydrogenated to eliminate or reduce unsaturation. These natural product oils that can be employed in the present invention include compounds that have the following formula:

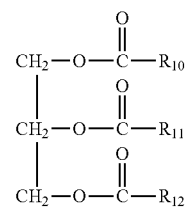

where $R_{10}$ $R_{11}$ and $R_{12}$ may be the same or different fatty acid radicals containing from 8 to 22 carbon atoms.

Suitable natural product oils of the above formula that can be employed in the present invention include, but are not limited to: Kernel Oil; Argania Spinosa Oil; *Argemone Mexicana* Oil; Avocado (*Persea Gratissima*) Oil; Babassu (*Orbignya Olelfera*) Oil; Balm Mint (*Melissa Officinalis*) Seed Oil; Bitter Almond (*Prunus Amygdalus Amara*) Oil; Bitter Cherry (*Prunus Cerasus*) Oil; Black Currant (*Ribes Nigrrrm*) Oil; Borage (*Borago Officinalis*) Seed Oil; Brazil (B3ertholletia *Excelsa*) Nut Oil; Burdock (*Arctium Lappa*) Seed Oil; Butter; $C_{12-18}$ Acid Triglyceride; Calophyllurn Tacamahaca Oil; *Camellia* Kissi Oil; *Camellia Oleifera* Seed Oil; Canola Oil; Caprylic/Capric/Liuric Triglyceride; Caprylic/Capric/Linoleic Triglyceride; Caprylic/Capric/Myristic/Stearic Triglyceride; Caprylic/Capric/Stearic Triglyceride; Caprylic/Capric Triglyceride; Caraway (*Canimn Carvil*) Seed Oil; Carrot (*Daucus Carota Sativa*) Oil; Cashew (*Anacardium Occidentale*) Nut Oil; Castor (*Ricinus Communis*) Oil; Cephalins; Chaulmoogra (*Taraktogenos Kurzii*) Oil, Chia (*Salvia Hispanica*) Oil; Cocoa (*Theobrama Cocao*) Butter; Coconut (*Cocos Nucifera*) Oil; Cod Liver Oil; Coffee (*Coffea Arabica*) Oil; Corn (*Zea Mays*) Germ Oil; Corn (*Zea Mays*) Oil; Cottonseed (*Gossypium*) Oil; $C_{10-18}$ Triglycerides; Cucumber (*Cucumis Sativus*) Oil; Dog Rose (*Rosa Canina*) Hips Oil; Egg Oil; Emu Oil; Epoxidized Soybean Oil; Evening Primrose (*Oenothera Biennis*) Oil; Fish Liver Oil; Gevuina Aveliana Oil; Glyceryl Triacetyl Hydroxystearate; Glyceryl Triacetyl Ricinoleate; Glycolipids; Glycosphingolipids; Goat Butter; Grape (*Vitis Vinifera*) Seed Oil; Hazel (*Croylus Americana*) Nut Oil; Hazel (*Corylus* Aveilana) Nut Oil; Human Placental Lipids; Hybrid Safflower (*Ceathamus Tinctorius*) Oil; Hybrid Sunflower (*Helianthus Annuus*) Seed Oil; Hydrogenated Canola Oil; Hydrogenated Castor Oil; Hydrogenated Castor Oil Laurate; Hydrogenated Castor Oil Triisostearate; Hydrogenated Coconut Oil; Hydrogenated Cottonseed Oil; Hydrogenated $C_{12-18}$ Triglycerides; Hydrogenated Fish Oil; Hydrogenated Lard; Hydrogenated Menhaden Oil; Hydrogenated Milk Lipids; Hydrogenated Mink Oil; Hydrogenated Olive Oil; Hydrogenated Orange Roughy Oil; Hydrogenated Palm Kernel Oil; Hydrogenated Palm Oil; Hydrogenated Peanut Oil; Hydrogenated Rapeseed Oil; Hydrogenated Shark Liver Oil; Hydrogenated Soybean Oil; Hydrogenated Tallow; Hydrogenated Vegetable Oil; *Isatis Tinctoria* Oil; Job's Tears (*Coix Lacryma-Jobi*) Oil; Jojoba Oil; Kiwi (*Actinidia Chinensis*) Seed Oil; Kukui (*Aleurites Moluccana*) Nut Oil; Lard; Lauric/Palmitic/Oleic Triglyceride; Linseed (*Linum Usitatissiumum*) Oil; Lupin (*Lupinus Albus*) Oil; Macadamia Nut Oil; Macadamia *Ternifolia* Seed Oil; Macadamia *Integrifolia* Seed Oil; Maleated Soybean Oil; Mango (*Mangifera Indica*) Seed Oil; Marmot Oil; Meadowfoam (*Limnanthes fragraAlba*) Seed Oil; Menhaden Oil; Milk Lipids; Mink Oil; Moringa Pterygosperma Oil; *Mortierella* Oil; Musk Rose (*Rosa Moschata*) Seed Oil; Neatsfoot Oil; Neem (*Melia Azadirachta*) Seed Oil; Oat (*Avena Sativa*) Kernel Oil; Oleic/Linoleic Triglyceride; Oleic/Palmitic/Lauric/Myristic/L-inoleic Triglyceride; Oleostearine; Olive (*Olea Europaea*) Husk Oil; Olive (*Olea Europaea*) Oil; Omental Lipdis; Orange Roughy Oil; Ostrich Oil; Oxidized Corn Oil; Palm (*Elaeis Guineensis*) Kernel Oil; Palm (*Elaeis Guineensis*) Oil; Passionflower (*Passiflora Edulis*) Oil; Peach (*Prunus Persica*) Kernel Oil; Peanut (*Arachis Hypogaea*) Oil; Pecan (*Caiya Illinoensis*) Oil; Pengawar Djambi (*Cibotium Barometz*) Oil; Phospholipids; Pistachio (*Pistacia Vera*) Nut Oil; Placental Lipids; Poppy (*Papaver Orientale*) Oil; Pumpkin (*Cucurbita Pepo*) Seed Oil; Quinoa (*Chenopodium Quinoa*) Oil; Rapeseed (*Brassica Campestris*) Oil; Rice (*Oryza Sativa*) Bran Oil; Rice (*Oryza Sativa*) Germ Oil; Safflower (*Carthamus Tinctorius*) Oil; Salmon Oil; Sandalwood (*Santalum Album*) Seed Oil; Seabuchthom (*Hippophae Rhamnoides*) Oil; Sesame (*Sesamum Indicum*) Oil; Shark Liver Oil; Shea Butter (*Butyrospermum Parkii*); Silk Worm Lipids; Skin Lipids; Soybean (*Glycine Soja*) Oil; Soybean Lipid; Sphingolipids; Sunflower (*Helianthus Annuus*) Seed Oil; Sweet Almond (*Prunus Amygdalus Dulcis*) Oil; Sweet Cherry (*Prunus Avium*) Pit Oil; Tali Oil; Tallow; Tea Tree (*Melaleuca Altemifolia*) Oil; Telphairia Pedata Oil; Tomato (*Solanum Lycopersicum*) Oil; Triarachidin; Tiibehenin; Tricaprin; Tricaprylin; Trichodesma Zeylanicum Oil; Trierucin; Triheptanoin; Triheptylundecanoin; Trihydroxymethoxystearin; Trihydroxystearin; Triisononanoin; Triisopalmitin; Triisostearin; Trilaurin; Trilinolein; Trilinolenin; Trimyristin; Trioctanoin; Triolein; Tripalmitin; Tripalmitolein; Triricinolein; Trisebacin; Tristearin; Triundecanoin; Tuna Oil; Vegetable Oil; Walnut (*Juglans Regia*) Oil; Wheat Bran Lipids; and Wheat (*Triticum Vulgare*) Germ Oil. In some preferred embodiments, the natural oil product is one or more of soybean oil, coconut oil, rapeseed oil, high oleic acid sunflower oil or olive oil. The oils of the present invention may be partially or fully hydrogenated.

The amount of softener or ester, preferably biorenewable ester-containing oils, present in the thermoplastic elastomer compositions of the present invention can vary depending upon the types of polymers utilized and end products desired to be formed with the compositions. That said, in one embodiment, the amount of softener, preferably biorenewable, utilized in the thermoplastic elastomer compositions ranges generally from about 5 to about 400 parts, desirably from about 50 to about 250 parts, and preferably from about 75 or 100 to about 200 parts by weight based on 100 total parts by weight of totals styrenic block copolymer. In another embodiment, the softener or ester, preferably biorenewable, ranges in an amount generally from about 1 to about 85 parts, desirably from about 5 to about 75 parts, and preferably from about 10 to 65 about parts by weight based on 100 total parts by weight of the composition.

Still additional softeners or extenders include fatty ethers, fatty alcohols and fatty amines. Said components, individually, can be utilized in amounts set forth for the softeners or esters hereinabove.

Fatty Ethers

Fatty ethers are utilized in some compositions of the present invention. Fatty ethers having the general formula $R_{13}$—O—$R_{14}$, can be utilized wherein $R_{13}$ contains from about 6 to about 34 carbon atoms and preferably from about 10 to about 22 carbon atoms, and $R_{14}$ contains from about 1 to about 22 carbon atoms and preferably from about 4 to about 22 carbon atoms. The fatty ethers can be linear or branched.

Fatty Alcohols

Fatty alcohols are utilized in some compositions of the present invention. Fatty alcohols having the general formula $R_{15}$—OH, can be utilized wherein $R_{15}$ contains from about 6 to about 34 carbon atoms and preferably from about 13 to about 34 carbon atoms. Examples of fatty alcohols include, but are not limited to 1-hexanol, 1-heptanol, 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-heneicosanol, 1-docosanol, 1-tricosanol, 1-tetracosanol, 1-pentacosanol, 1-hexacosanol, 1-heptacosanol, 1-octasanol, 1-nonacosanol, 1-tricontanol, 1-hentriacontanol, 1-dotriacontanol, 1-tritriacontanol, and 1-tetratriacontanol. In one embodiment, at least one fatty alcohol utilized includes saturation and branching. The fatty alcohols can be linear or branched, for example Guerbet alcohols.

Fatty Amines

Fatty amines are utilized in some compositions of the present invention. Fatty amines can be utilized having the general formula:

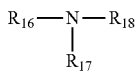

wherein each $R_{16}$, $R_{17}$ and $R_{18}$, independently, is hydrogen, or contains from about 4 to about 34 carbon atoms and preferably from about 10 to about 22 carbon atoms, with the proviso that at least one said R is not hydrogen. Examples of suitable fatty amines include, but are not limited to, amines derived from fatty acids, for example, dimethyl stearamine, stearyl amine, and oleyl amine. In one embodiment at least one fatty amine utilized includes saturation and branching. The fatty amines can be linear or branched.

B) Synergistic Additives, Preferably Biorenewable

As indicated hereinabove, the compositions of the present invention also include a synergistic additive that is believed to create greater stability within the thermoplastic elastomer compositions. Some biorenewable synergistic additives are polar components in various embodiments. The polar synergistic additive can provide one or more of better oil retention at room temperature and at higher temperatures and in some embodiments, greater tensile strength, tensile modulus at various percentages, tensile elongation and tear strength when compared to a corresponding composition without the additive. The thermoplastic elastomer compositions of the present invention can be processed in standard processing equipment such as injection molders and extruders.

A number of different biorenewable synergistic additives can be utilized in combination with the biorenewable softeners of the present invention. For example, additives include, but are not limited to, starches; thermoplastic starches; and biorenewable polar polymers such as aliphatic polyesters, e.g. polylactic acids and polylactides.

Starch

In one embodiment, starches and/or starch-containing components are utilized as a biorenewable synergistic additive. Starch-containing components as utilized herein refer to a composition comprising at least starch and preferably a dispersion aid, for example glycerin. For example, in one embodiment of a dry blend process, if starch is used, a dispersion aid such as glycerin is added to provide desired dispersion of the starch in the blend.

The term "starch" as utilized herein refers to any starch of natural origin whether processed, chemically modified, or treated. Suitable starches comprise corn starch, potato starch, amaranth starch, arrowroot starch, banana starch, barley starch, cassava starch, millet starch, oat starch, pea starch, rice starch, rye starch, sago starch, sorghum starch, sweet potato starch, tapioca starch, wheat starch, and yam starch.

The effective plasticizer or dispersion aid helps swell and break the crystalline starch granule, and helps lubricate newly exfoliated, amorphous crystalline starch segments to obtain the thermoplastic starch. Heat and shear further aids in the starch gelatinization process. The plasticizer or dispersion aid can include polyols, such as glycerol, sorbitol etc., adipic acid derivatives, such as tridecyl adipate, benzoic acid derivatives, such as isodecyl benzoate, citric acid derivatives, such as tributyl citrate, glycerol derivatives, phosphoric acid derivatives, such as tributyl phosphate, polyesters, sebacic acid derivatives, dimethyl sebacate, urea. The plasticizer or dispersion aid can also be selected from one or more of glycerine, ethylene glycol, propylene glycol, ethylene diglycol, ethylene triglycol, propylene triglycol, polyethylene glycol, polypropylene glycol, 1,2-propanediol, 1,3-propanediol, 1,2-butanediol, 1,3-butanediol, 1,4-butanediol, 1,5-pentanediol, 1,6-hexanediol, 1,5-hexanediol, 1,2, 6-hexanetriol, 1,3,5-hexanetriol, neopentyl glycol, trimethylol propane, pantaerythritol, and the acetate, ethoxylate, and propoxylate derivatives thereof. Moreover, the plasticizer or dispersion aid can be selected from one or more of sorbitol ethoxylate, glycerol ethoxylate, pentaerythritol ethoxylate, sorbitol acetate, and pentaerythritol acetate.

Starches and starch-containing components provide improved softener stability. In various embodiments with other biorenewable components, for example PLA, compositions having desired hardness ranges can be achieved. Starches and starch-containing components further increase bio-renewable content of the compositions in addition to the biorenewable content of the compositions derived from the softener or plasticizer, without significant deterioration of the mechanical properties of the compositions.

Starch includes modified starches, such as chemically treated and cross-linked starches, and starches in which the hydroxyl groups have been substituted with organic acids, to provide esters or with organic alcohols to provide ethers, with degrees of substitution in the range 0-3.

Starch also includes extended starches, such as those extended with proteins; for example with soya protein.

Thermoplastic Starch

The biorenewable additives of the present invention also include thermoplastic starches. Thermoplastic starches offer the advantages of the capability of flow and are thus suitable for use in polymer processing methods and equipment. Thermoplastic starches are available from various commercial sources in compounded form. In various embodiments, thermoplastic starches are prepared and used simultaneously in a compounding process to form compositions of the present invention. Methods of preparing thermoplastic starch are disclosed in U.S. Pat. No. 6,605,657, herein incorporated by reference. In various embodiments of the present invention a dry blended mixture of elastomer such as styrenic block copolymer, thermoplastic and softener together with other processing additives are fed through an extruder. The mixture is then melt mixed with the thermoplastic starch in the remaining downstream portion of the extruder. There are two extruders involved in this operation. The two are connected in a "T" shape.

When present in compositions of the present invention, the total starch, one or more of starch and thermoplastic starch, is in an amount from about 2 to about 40 or 80, desirably from about 2 to about 60 and preferably from 2 to about 40 parts by weight based on 100 total parts by weight of the composition. When utilized, the dispersion aid is present in an amount from about 1 to about 80, desirably from about 2 to about 60 and preferably from 2 to about 50 parts by weight based on 100 parts of the starch.

Polar Polymer

The biorenewable synergistic additives also include polar polymers such as aliphatic polyesters. Examples of suitable aliphatic polyesters include polylactic acids, and polylactides [PLAs], poly(glycolic acids) and polyglycolides [PGAs], poly (lactic-co-glycolic), and poly(lactide-co-glycolide) [PLGA], polyglyconate, poly(hydroxyalkanoates) [PHAs], polyorthoesters [POEs], polycaprolactones [PCLs], polydioxanone [PDS], polyanhydrides [PANs], polyether-block-amide (PEBA), and their copolymers.

The polar polymers are provided in amounts which impart desirable properties to the thermoplastic elastomer compositions of the invention, and, when present, generally range in an amount from about 0.1 or 1 to about 80 parts, desirably from about 2 to about 60 parts, and preferably from about 2 or 3 to about 20 or 40 parts based on 100 total parts by weight of the composition of the present invention.

Polyolefins

In one embodiment, the compositions of the present invention optionally include one or more polyolefins, which as utilized herein are defined as one or more of a polyolefin polymer and a polyolefin copolymer unless otherwise indicated. Polyolefins suitable for use in the compositions of the present invention comprise amorphous or crystalline homopolymers or copolymers of two or more same or different monomers derived from alpha-monoolefins having from 2 to about 12 carbon atoms, and preferably from 2 to about 8 carbon atoms. Examples of suitable olefins include ethylene, propylene, 1-butene, 1-pentene, 1-hexene, 2-methyl-1-propene, 3-methyl-1-pentene, 4-methyl-1-pentene, 5-methyl-1-hexene, and combinations thereof. Polyolefins include, but are not limited to, low-density polyethylene, high-density polyethylene, linear-low-density polyethylene, polypropylene (isotactic and syndiotactic), ethylene/propylene copolymers, and polybutene. Polyolefin copolymers can also include the greater part by weight of one or more olefin monomers and a lesser amount of one or more non-olefin monomers such as vinyl monomers including vinyl acetate, or a diene monomer, etc. Polar polyolefin polymers include ethylene acrylate and ethylene vinyl acetate, for example. In a preferred embodiment, EVA is utilized that has a vinyl acetate content of greater than 5 percent. Generally, a polyolefin copolymer includes less than 40 weight percent of a non-olefin monomer, desirably less than 30 weight percent, and preferably less than about 10 weight percent of a non-olefin monomer.

In a further embodiment, the polyolefin can include at least one functional group per chain or can be a blend of non-functionalized polyolefins and functionalized polyolefins. Functional groups can be incorporated into the polyolefin by the inclusion of for example, one or more non-olefin monomers during polymerization of the polyolefin. Examples of functional groups include, but are not limited to, anhydride groups such as maleic anhydride, itaconic anhydride and citraconic anhydride; acrylates such as glycidyl methacrylate; acid groups such as fumaric acid, itaconic acid, citraconic acid and acrylic acid; epoxy functional groups; and amine functional groups. Functional group-containing polyolefins and methods for forming the same are well known to those of ordinary skill in the art. Functionalized polyolefins are available commercially from sources such as Uniroyal, Atofina, and DuPont. Epoxy modified polyethylenes are available from Atofina as LOTADER®. Acid modified polyethylenes are available from DuPont as FUSABOND®.

Polyolefin polymers and copolymers are commercially available from sources including, but not limited to, Chevron, Dow Chemical, DuPont, ExxonMobil, Huntsman Polymers, Ticona and Westlake Polymer under various designations.

When present, the polyolefins range in an amount generally from about 0.5 to about 60 parts, desirably from about 0.5 or 2 to about 30 or 50 parts, and preferably from about 0.5 to about 20 or 40 parts by weight based on 100 total parts by weight of the total composition.

Additives

The compositions of the present invention may include additional additives including, but not limited to lubricants, light stabilizers, antioxidant, flame retardant additives, pigments, peroxides, heat stabilizers, processing aids, mold release agents, flow enhancing agents, nanoparticles, foam agents, platelet fillers and non-platelet fillers. Examples of fillers for use in the compositions include, but are not limited to, one or more of calcium carbonate, talc, clay, zeolite, silica, titanium dioxide, carbon black, barium sulfate, mica, glass fibers, whiskers, carbon fibers, magnesium carbonate, glass powders, metal powders, kaolin, graphite, and molybdenum disulfide. Suitable fillers include bio-based fillers, e.g. various fibers, cellulose, and/or lignin.

Other Polymers

In various embodiments, other polymers can be added to the compositions of the present invention in an assortment of amounts provided that such polymers do not interfere with the desired performance of the compositions and constructions formed therewith. Examples of additional polymers include, but are not limited to, polyamide such as nylon, acrylonitrile-butadiene-styrene copolymers (ABS), halogenated polymers such as polyvinyl chloride, polycarbonates, acrylic polymers, PET, PBT, TPU (including TPU with a bio based polyester block), polyether-block-amide (PEBA).

The high biorenewable content thermoplastic elastomer compositions of the present invention can be formed by blending the desired components in one or more steps, preferably by mixing. The composition is preferably heated to obtain a melted composition, preferably with mixing, to substantially disperse the components thereof. Melt blending is performed at a temperature generally from about 150° C. to about 250° C. and preferably from about 170° C. to about 210° C. The compositions can be prepared for example in a Banbury, on a two roll mill, in a continuous mixer such as a single screw or twin screw extruder, a kneader, or any other mixing machine as known to those of ordinary skill in the art. The compositions containing thermoplastic starch are prepared in a one step process using combination of single screw extruder connected midway to a twin screw extruder. The process is described in detail in U.S. Pat. No. 6,844,380 herein fully incorporated by reference. After preparation of the compositions, they can be pelletized or diced utilizing appropriate equipment, if desired for future further processing. Alternatively, the compositions can be directly molded, or shaped as desired for example using an extruder, injection molder, compression molder, calender, or the like.

As described herein, desirable compositions can be formed utilizing the teachings of the present invention which exhibit high oil stability; low oil softener or ester leaching; or low oil, etc., bleeding. Oil stability or the like is defined in one embodiment according to the present invention utilizing a loop spew test as defined with the examples section. Desirable compositions according to the present invention have a loop spew rating of 2 or less, desirably 1 or less, and preferably 0, that is no visible evidence of oil on the loop surface.

The compositions of the present invention can be utilized to form a variety of articles or parts of articles such as, but not limited to, shaving razors, toothbrushes, writing utensils such as pens or pencils, brushes such as paint brushes and hair brushes, hair dryers, tools, for example screwdrivers, hammers, wrenches, pliers and saws, kitchen appliances, for example handles for refrigerators, ovens, microwaves, dishwashers, kitchen utensils, such as spoons, forks, knives, spatulas, can openers, bottle openers, corkscrews, whisks and vegetable peelers, vacuum cleaner handles, brooms, mops, rakes, shovels, scissors, sporting equipment, such as fishing poles, firearms, tennis rackets, and golf clubs, bracelets for example for absorbing sweat, various seals including automotive weather seals, window encapsulation. The thermoplastic elastomer compositions of the invention can also be coated on fabric, such as making wet grip gloves, non-skid fabrics, etc.

The compositions of the present invention may be formed as a composite with a different substrate for example by connecting the composition of the present invention to the substrate utilizing any desired method, for example overmolding, insert molding, coextrusion, welding or bonding with an adhesive. Overmolding generally involves bonding the thermoplastic elastomer composition to a polymeric substrate utilizing a two-shot or multi-shot injection molding process or a co-injection molding process. Overmolding generally includes providing two or more different materials that are injected into the same mold during the same molding cycle. Insert molding generally comprises inserting pre-molded or pre-formed substrate into a mold and the composition of the present invention is molded directly over or to at least a portion of the insert.

Figure 2:
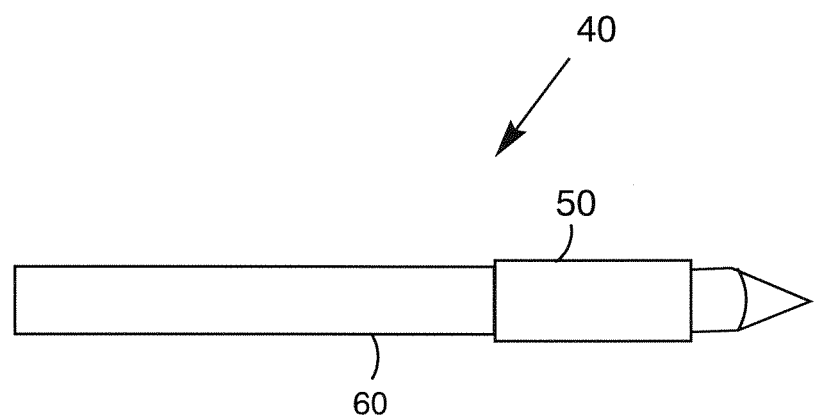
FIG. 2 illustrates one embodiment of an article, in particular a grip, of a thermoplastic elastomer composition having biorenewable content connected to a substrate, in particular a writing utensil.

FIG. 1 illustrates one embodiment of a composite 10 which comprises a layer 20 including a thermoplastic elastomer composition having biorenewable content of the present invention connected to a substrate 30. The substrate can be, for example, one or more of a polymer, rubber or other elastomer, glass, metal or natural substrate, such as wood. FIG. 2 illustrates a writing utensil 40 having a grip 50 formed comprising a composition of the present invention including biorenewable content. Grip 50 is connected to body 60, in particular formed in the shape of a pen.

For the avoidance of doubt, the compositions of the present invention encompass all possible combinations of the components, including various ranges of said components, disclosed herein.

EXAMPLES

The examples set forth below are provided to illustrate the high biorenewable content thermoplastic elastomer compositions of the present invention. These examples are not intended to limit the scope of the invention.

Sample Preparation: All formulations were prepared in a Leistriz 30 mm intermeshing co-rotating twin screw extruder with L/D ratio of 40:1. All ingredients were pre-mixed to a uniform, free-flowing state and then fed to the main feed throat. The extrusion temperature was 170-200° C. and the extruder screw speed was 180-350 RPM. Samples from the twin screw extruder were then injection molded at 170-190° C. into plaques approximately 2 mm thick, 6.0 cm wide by 8.75 cm long.

| Specific Gravity | | ASTM D-792 |
|---|---|---|
| Hardness (Inst./5 sec) | Shore A | ASTM D-2240 |
| MFR 190° C., 2.16 kg | g/10 min | ASTM D-1238 |
| Tensile Strength | psi | ASTM D-412 |
| 50% Modulus | psi | ASTM D-412 |
| 100% Modulus | psi | ASTM D-412 |
| 300% Modulus | psi | ASTM D-412 |
| Tensile Elongation | % | ASTM D-412 |
| Tear Strength | pli | ASTM D-624 |
| Shear Viscosity, 5-5000 1/S, 200° C. | Pa · s | ASTM D3835 |

Loop Spew Test: The oil stability in the compounded TPE was tested with a method modified from ASTM D 3291, which was designed for testing plasticizer stability in PVC compound. An approximately 2.54 cm×8.75 cm specimen was cut from an approximately 2 mm thick molded plaque. The test specimen was conditioned for a minimum of 20 hours at 23° C. A line having a width of about 0.5 mm is drawn in the middle of the specimen along the long direction of the specimen using a ballpoint pen. The conditioned specimen was placed in the loop holder so that a 1.27 cm loop was formed from the edge of the clamp to the inner edge of the loop, with tolerance being +/−0.159 cm. The clamped specimen was conditioned for 24 hrs at 23° C., or other temperature as specified within a specific example. The specimen was removed from the clamp, examined, and rated as follows:

| Loop Spew Rating | Amount of Oil Exudation | Comment |
|---|---|---|
| 0 | None | No visible evidence of oil in the loop surface |
| 1 | Very Slight | Very slight sign of oil appears near the crease line, ball-point line stays sharp, and cannot be rubbed off |
| 2 | Slight | Slight sign of oil appears uniformly in the loop, line stays sharp but starts to widen |
| 3 | Moderate | Moderate oil uniformly appears in the loop. Line further widens and can be rubbed off |
| 4 | Severe | Some areas have oil drop, some part of the line starts to disappear |
| 5 | Heavy/Dripping | Heavy oil dripping, line has mostly disappeared |

The following raw materials were utilized for the examples.

| SBC1 | Septon 4055 from Kuraray |
|---|---|
| SBC2 | Kraton A1535H |
| SBC3 | Kraton 1633 |
| Soybean oil | Cargill technical grade soybean oil |
| HOAS oil | High Oleic Acid Sunflower oil, Cargil Agri-pure 80 |
| HS oil | Hydrogenated Soybean oil, Cargil 23765 - Stable Flake S |
| PP1 | Braskem D115A 12 MI PP |
| PP2 | Braskem F008F 0.8 MI PP |
| PLA | Nature Works polylactic acid 4032D |
| SEBS-MA | Kraton FG1901 GT |
| Pure TPS | Thermoplastic starch containing 24% glycerin and 76% potato starch was prepared according to U.S. Pat. No. 6,605,657 |
| White Mineral Oil | Kristaol 550 from Petra-Canada |
| CaCO3 | Omyacarb 3 from Omya Inc |
| Potato Starch | MSP Potato Starch from Manitoba Starch Products |
| Glycerin, technical grade | TR-Glycerine from Twin Rivers Technologies Inc. |
| EVA | Elvax 460 from DuPont |

TABLE 1

| | | Experiment Number | | |
|---|---|---|---|---|
| | | Comparative #1 | Comparative #2 | Comparative #3 | Example #1 |
| SBC1 | | 37.23% | | | |
| SBC2 | | | 37.23% | 37.23% | 25.34% |
| SBC3 | | | | | 6.98% |
| PP1 | | 13.96% | 13.96% | 13.96% | |
| PP2 | | | | | 10.68% |
| PLA | | | | | 4.65% |
| White Mineral Oil | | 48.40% | 48.40% | | |
| Soybean Oil | | | | 48.40% | 48.17% |
| CaCO3 | | | | | 3.72% |
| Irganox 1010 | | 0.20% | 0.20% | 0.20% | 0.23% |
| Irgafos 168 | | 0.20% | 0.20% | 0.20% | 0.23% |
| Total (Wt. %) | | 100.00% | 100.00% | 100.00% | 100.00% |
| Total Bio Content (Wt. %) | | 0.0% | 0.0% | 48.4% | 52.8% |
| Loop Spew (Room Temperature, 1.27 cm loop, 24 hrs) | Units | 0, no oil spew | 3, oil spew, line straight, easily rubbed off. | 2, oil spew, line straight, easily rubbed off. | 1 Very minor oil spew at the crease line. Much improved over other hard grade bio TPE |
| Specific Gravity | | 0.884 | 0.904 | 0.932 | 0.939 |
| Stand Hardness (inst.) | A | 60.0 | 58.0 | 56.0 | 60.0 |
| Stand Hardness (5 sec) | A | 54.0 | 50.0 | 50.0 | 53.0 |
| Tensile Strength | Psi | 1362 | 759 | 1144 | 804 |
| Tensile Modulus at 50% | Psi | 194 | 177 | 199 | 233 |
| Tensile Modulus at 100% | Psi | 230 | 223 | 244 | 297 |
| Tensile Modulus at 300% | Psi | 326 | 369 | 385 | 452 |
| Tensile Elongation | % | 798 | 611 | 793 | 713 |
| Tear Strength (Die C) | Pli | 138 | 103 | 136 | 153 |

TABLE 2

| | | Experiment Number | | |
|---|---|---|---|---|
| | | Comparative #4 | Example #2 | Example #3 |
| SBC2 | | 29.44% | 26.76% | 26.76% |
| PP1 | | 8.61% | 7.83% | 7.83% |
| SOYBEAN OIL | | 54.45% | 49.50% | 49.50% |
| CaCO3 | | 4.00% | 3.64% | 3.64% |
| SEBS-MA | | 3.00% | 2.73% | 2.73% |
| Pure TPS | | | 9.09% | |
| Potato Starch | | | | 7.27% |
| Glycerin, technical grade | | | | 1.82% |
| Irganox 1010 | | 0.25% | 0.23% | 0.23% |
| Irgafos 168 | | 0.25% | 0.23% | 0.23% |
| Total (Wt. %) | | 100.00% | 100.00% | 100.00% |
| Total Bio Content (Wt. %) | | 54.5% | 58.6% | 58.6% |
| Loop Spew (Room Temperature, 1.27 cm loop, 24 hrs) | Units | 2, line may be rubbed off | 1, No oil spew, but line may be rubbed off | 0 No oil spew |
| Specific Gravity | | 0.953 | 0.979 | 0.979 |
| Melt Flow Rate (190° C./2160 kg) | g/10 min | 41.0 | 78.9 | 41.5 |
| Stand Hardness (inst.) | A | 38.0 | 38.0 | 34.0 |
| Stand Hardness (5 sec) | A | 33.0 | 30.0 | 31.0 |
| Tensile Strength | psi | 420 | 466 | 362 |
| Tensile Modulus at 50% | psi | 135 | 105 | 108 |
| Tensile Modulus at 100% | psi | 172 | 137 | 139 |
| Tensile Modulus at 300% | psi | 265 | 224 | 221 |
| Tensile Elongation | % | 601 | 747 | 638 |
| Tear Strength (Die C) | pli | 91 | 84 | 88 |
| Shear Viscosity @ 232 1/s (200° C., L/D = 30) | Pa·s | 73 | 81 | 71 |

TABLE 3

| Experiment Number | Comparative #5 | Example #4 | Example #5 | Example #6 | Example #7 |
|---|---|---|---|---|---|
| SBC2 | 24.24% | 27.24% | 25.34% | 25.34% | 25.34% |
| SBC3 | | | 6.98% | 6.98% | 6.98% |

TABLE 3-continued

|  |  |  |  |  |  |  |
|---|---|---|---|---|---|---|
| PP1 |  | 16.48% |  |  |  |  |
| PP2 |  |  |  |  | 10.68% | 10.68% |
| Soybean Oil |  | 51.78% | 51.78% | 48.17% | 48.17% | 48.17% |
| CaCO3 |  | 4.00% | 4.00% | 3.72% | 3.72% | 3.72% |
| SEBS-MA |  | 3.00% |  |  |  |  |
| PLA |  |  | 16.48% | 15.33% | 4.65% |  |
| EVA |  |  |  |  |  | 4.65% |
| Irganox 1010 |  | 0.25% | 0.25% | 0.23% | 0.23% | 0.23% |
| Irgafos 168 |  | 0.25% | 0.25% | 0.23% | 0.23% | 0.23% |
| Total (Wt. %) |  | 100.00% | 100.00% | 100.00% | 100.00% | 100.00% |
| Total Bio Content (Wt. %) |  | 51.8% | 68.3% | 63.5% | 52.8% | 48.2% |
| Loop Spew (Room Temperature, 0.5 in loop, 24 hrs) | Units | 3, oil spew visible | 0 No Oil Spew | 0 No Oil Spew | 1 Very minor oil spew at the crease line. Much improved over other hard grade bio TPE | 1 Very minor oil spew at the crease line. Much improved over other hard grade bio TPE |
| Specific Gravity |  | 0.950 | 1.003 | 0.995 | 0.939 | 0.933 |
| Melt Flow Rate (190° C./2160 kg) | g/10 min | 56.1 | 65.2 | 14.0 | 5.1 | 4.0 |
| Stand Hardness (inst.) | A | 57.0 | 20.0 | 18.0 | 60.0 | 53.0 |
| Stand Hardness (5 sec delayed) | A | 52.0 | 17.0 | 17.0 | 53.0 | 46.0 |
| Tensile Strength | Psi | 552 | 343 | 417 | 804 | 826 |
| Tensile Modulus at 50% | Psi | 222 | 54 | 157 | 233 | 172 |
| Tensile Modulus at 100% | Psi | 269 | 83 | 219 | 297 | 222 |
| Tensile Modulus at 300% | Psi | 390 | 173 | 349 | 452 | 358 |
| Tensile Elongation | % | 575 | 683 | 540 | 713 | 769 |
| Tear Strength (Die C) | Pli | 129 | 54 | 122 | 153 | 113 |
| Shear Viscosity @ 232 1/s (200° C., L/D = 30) | Pa · s | 59 | 68 | 144 | 171 | 181 |

TABLE 4

| Experiment Number | Comparative #6 | Example #8 | Example #9 | Example #10 | Example #11 | Example #12 |
|---|---|---|---|---|---|---|
| SBC2 | 21.19% | 21.45% | 24.19% | 22.50% | 22.50% | 22.50% |
| SBC3 |  | 7.59% |  | 6.98% | 6.98% | 6.98% |
| PP1 | 20.71% | 15.18% |  |  |  |  |
| PP2 |  |  |  |  | 14.61% | 14.61% |
| Soybean Oil | 50.60% | 51.22% | 50.60% | 47.07% | 47.07% | 47.07% |
| CaCO3 | 4.00% | 4.05% | 4.00% | 3.72% | 3.72% | 3.72% |
| SEBS-MA | 3.00% |  |  |  |  |  |

TABLE 4-continued

| | | | | | | | |
|---|---|---|---|---|---|---|---|
| PLA | | | | 20.71% | 19.27% | 4.65% | |
| EVA | | | | | | | 4.65% |
| Irganox 1010 | | 0.25% | 0.25% | 0.25% | 0.23% | 0.23% | 0.23% |
| Irgafos 168 | | 0.25% | 0.25% | 0.25% | 0.23% | 0.23% | 0.23% |
| Total (Wt. %) | | 100.00% | 100.00% | 100.00% | 100.00% | 100.00% | 100.00% |
| Total Bio Content (Wt. %) | | 50.6% | 51.2% | 71.3% | 66.3% | 51.7% | 47.1% |
| Loop Spew (Room Temperature, 0.5 in loop, 24 hrs) | Units | 3, oil spew visible | 2 Slight oil spew. Line stay sharp | 0 No Oil spew | 0 No Oil spew | 1 Very minor oil spew at the crease line. Much improved over other hard grade bio TPE | 1 Very minor oil spew at the crease line. Much improved over other hard grade bio TPE |
| Specific Gravity | | 0.948 | 0.955 | 1.013 | 1.006 | 0.934 | 0.930 |
| Melt Flow Rate (190° C./2160 kg) | g/10 min | 58.3 | 26.1 | 94.7 | 22.4 | 4.8 | 4.9 |
| Stand Hardness (inst.) | A | 67.0 | 58.0 | 19.0 | 13.0 | 70.0 | 63.0 |
| Stand Hardness (5 sec) | A | 63.0 | 52.0 | 16.0 | 12.0 | 62.0 | 57.0 |
| Tensile Strength | Psi | 528 | 687 | 215 | 383 | 859 | 873 |
| Tensile Modulus at 50% | Psi | 283 | 179 | 36 | 209 | 302 | 264 |
| Tensile Modulus at 100% | Psi | 330 | 220 | 52 | 283 | 368 | 323 |
| Tensile Modulus at 300% | Psi | 443 | 338 | 117 | 379 | 519 | 470 |
| Tensile Elongation | % | 497 | 750 | 625 | 278 | 686 | 653 |
| Tear Strength (Die C) | Pli | 140 | 112 | 69 | 111 | 171 | 147 |
| Shear Viscosity @ 232 1/s (200° C., L/D = 30) | Pa · s | 56 | 91 | 49 | 116 | 160 | 175 |

TABLE 5

| Experiment Number | | Comparative #7 | Example #13 | Example #14 | Example #15 | Example #16 |
|---|---|---|---|---|---|---|
| SBC2 | | 27.44% | 23.84% | 23.84% | 23.84% | 23.84% |
| SBC3 | | | 7.15% | 7.15% | 7.15% | 7.15% |
| Soybean Oil | | 60.33% | 52.46% | 35.77% | | |
| HOAS oil | | | | | 52.45% | 35.77% |
| HS Oil | | | | 16.69% | | 16.69% |
| PP2 | | 8.23% | 7.15% | 7.15% | 7.15% | 7.15% |
| PLA | | | 5.96% | 5.96% | 5.96% | 5.96% |
| CaCO3 | | 3.29% | 2.87% | 2.87% | 2.87% | 2.87% |
| Irganox 1010 | | .44% | .38% | .38% | .38% | .38% |
| Irgafos 168 | | .22% | .19% | .19% | .19% | .19% |
| Total (Wt. %) | | 100 | 100 | 100 | 100 | 100 |
| Total Bio content, (Wt. %) | | 60.37% | 58.42% | 58.42% | 58.42% | 58.42% |
| Loop Spew (Room Temperature, 0.5 in loop, 24 hrs) | Units | 3.0 | 1.5 | 0.0 | 1.5 | 0.0 |
| Specific Gravity | | 0.940 | 0.957 | 0.968 | 0.952 | 0.966 |
| Melt Flow Rate (190° C./2160 kg) | g/10 min | 36.9 | 9.2 | 5.8 | 5.8 | 4.3 |
| Stand Hardness (inst.) | A | 30.0 | 41.0 | 60.0 | 42.0 | 60.0 |
| Stand Hardness (5 sec delayed) | A | 28.0 | 39.0 | 58.0 | 40.0 | 58.0 |

TABLE 5-continued

| | | | | | | |
|---|---|---|---|---|---|---|
| Tensile Strength | Psi | 537 | 525 | 834 | 578 | 896 |
| Tensile Modulus at 50% | Psi | 101 | 142 | 241 | 161 | 255 |
| Tensile Modulus at 100% | Psi | 138 | 200 | 299 | 224 | 310 |
| Tensile Modulus at 300% | Psi | 248 | 344 | 465 | 362 | 499 |
| Tensile Elongation | % | 740 | 659 | 666 | 701 | 571 |
| Tear Strength (Die C) | Pli | 96 | 117 | 169 | 122 | 167 |
| Shear Viscosity @ 232 1/s (200° C., L/D = 30) | | 232 | 84 | 137 | 134 | 134 | 134 |

As shown in Table 1, Comparative #1 is a general purpose TPE based on regular SBC and white mineral oil, Comparative #2 is based on a controlled distribution block-containing SEBS and mineral oil, and Comparative #3 on a controlled distribution block-containing SEBS with vegetable oil, and both Comparatives #2 and #3 showed noticeable oil spew. With the use of high MW SBC, and some polar polymer, PLA, the oil stability is much improved at equivalent hardness as illustrated in Example #1.

In Table 2, Comparative #4 showed substantial oil bleeding. Examples #2 and #3 with either TPS or starch with glycerin as a dispersion aid exhibited greatly improved oil stability.

In Table 3, Comparative #5 showed substantial oil bleeding. Examples #4 and #5 with a polar polymer, PLA, improved the oil stability, but reduced hardness/strength. Examples #6 & 7 showed improved oil stability and strength while maintaining hardness with the use of high MW SBC, high MW PP in addition to PLA or EVA.

In Table 4, Comparative #6 showed substantial oil bleeding. Example #8 showed some oil stability improvement with the use of relatively high MW SBC. Examples #9 and #10 with the polar polymer PLA improved the oil stability, but reduced hardness/strength. Examples #11 and #12 showed improved oil stability and strength while maintaining hardness with the use of high MW SBC, high MW PP in addition to PLA or EVA.

In Table 5, Comparative #7 exhibited substantial oil bleeding. The addition of a polar biopolymer, namely PLA, and high MW SBC significantly improved oil stability. Replacing a portion of the soybean oil with an ester-containing oil having relatively low polyunsaturation such as high oleic acid sunflower oil improved oil compatibility and heat stability, see Example 14. Replacing the soybean oil with an ester-containing oil having low-polyunsaturation, namely the high oleic acid sunflower oil also improved the oil compatibility and heat stability, see Example #15, as compared to Comparative #7. Example #16 including a combination of ester-containing oils, namely a high oleic acid sunflower oil and hydrogenated soybean oil exhibited the best bio-compatibility and heat stability between Examples 13 through 16.

While in accordance with the patent statutes the best mode and preferred embodiment have been set forth, the scope of the invention is not intended to be limited thereto, but only by the scope of the attached claims.

What is claimed is:

1. A thermoplastic elastomer composition, comprising:
   a styrenic tri-block copolymer comprising a controlled distribution copolymer midblock having a conjugated diene and a mono alkenyl arene, wherein the controlled distribution copolymer midblock comprises a) terminal regions being rich in conjugated dienes and b) a central region between the terminal regions rich in mono alkenyl arene units;
   a biorenewable softener comprising a natural ester, wherein the natural ester is an ester-containing oil which is present in an amount from 1 to 85 parts by weight based on 100 parts by weight of the composition;
   a biorenewable polar polymer present in an amount from 1 to 80 parts by weight based on 100 parts by weight of the composition, and wherein the biorenewable polar polymer is one or more of a polylactic acid, polylactide, poly(glycolic acid), polyglycolide, poly(lactic-co-glycolic), poly(lactide-co-glycolide), polyglyconate, poly(hydroxyalkanoate), polyorthoester, polycaprolactone, polydioxanone, polyanhydride, and polyether-block-amide;
   a high molecular weight styrenic block copolymer in an amount from about 1 parts to about 30 parts by weight per 100 parts by weight of the composition, wherein the high molecular weight styrenic block copolymer has a number average molecular weight greater than 300,000 g/mol; and
   a polyolefin.

2. The composition according to claim 1, wherein the styrenic tri-block copolymer having the controlled distribution copolymer midblock is present in an amount from 5 to 90 parts by weight based on 100 parts by weight of the composition.

3. The composition according to claim 2, wherein the biorenewable polar polymer is present in an amount from about 2 to about 60 parts by weight, and wherein the composition is free of mineral oil.

4. The composition according to claim 2, wherein the composition further includes a functionalized styrenic block copolymer.

5. The composition according to claim 2, wherein the composition includes one or more of starch and thermoplastic starch in an amount from 2 parts to 80 parts by weight.

6. The composition according to claim 2, wherein the biorenewable polar polymer is present in an amount from about 2 parts to about 60 parts by weight, and wherein the ester-containing oil is present in an amount from about 10 parts to about 65 parts by weight, and wherein the composition is free of a mineral oil.

7. The composition according to claim 2, wherein the ester-containing oil comprises hydrogenated oil.

8. The composition according to claim 1, wherein the high molecular weight styrenic block copolymer is present in an amount from about 2 to about 20 parts by weight, wherein the styrenic tri-block copolymer having the controlled distribution copolymer midblock is present in an amount from 20 to 35 parts by weight, wherein the biorenewable polymer is present in an amount from 2 to 20 parts by weight, and wherein the ester-containing oil is present in an amount from 10 to 65 parts by weight.

9. A thermoplastic elastomer composition, comprising:
a styrenic tri-block copolymer comprising a controlled distribution copolymer midblock having a conjugated diene and a mono alkenyl arene wherein the controlled distribution copolymer midblock comprises a) terminal regions being rich in conjugated dienes and b) a central region between the terminal regions rich in mono alkenyl arene units;
a biorenewable softener comprising an ester-containing oil, wherein the natural ester is an ester-containing oil which is present in an amount from 1 to 85 parts by weight based on 100 parts by weight of the composition;
a high molecular weight styrenic block copolymer having a number average molecular weight greater than 300,000 g/mol; and
a biorenewable polar polymer in an amount from 1 to 80 parts by weight based on 100 parts by weight of the composition, wherein the biorenewable polar polymer is one or more of a polylactic acid, polylactide, poly(glycolic acid), polyglycolide, poly(lactic-co-glycolic), poly(lactide-co-glycolide), polyglyconate, poly(hydroxyalkanoate), polyorthoester, polycaprolactone, polydioxanone, polyanhydride, and polyether-block-amide; and
a polyolefin in an amount from about 2 to about 40 parts based on 100 total parts by weight of the composition.

10. The composition according to claim 9, wherein the composition further includes one or more of starch and thermoplastic starch in an amount from about 2 parts to about 80 parts by weight based on 100 parts by weight of the composition, wherein a dispersion aid is present in an amount from about 1 to about 80 parts by weight based on 100 total parts by weight of starch and thermoplastic starch present.

11. The composition according to claim 10, wherein the styrenic tri-block copolymer having the controlled distribution copolymer midblock is present in an amount from 5 to 90 parts by weight, wherein the ester-containing oil is present in an amount from about 5 to about 75 parts by weight and wherein the composition further includes a functionalized styrenic block copolymer.

12. The composition according to claim 10, wherein the styrenic tri-block copolymer having the controlled distribution copolymer midblock is present in an amount from 20 to 35 parts by weight, wherein the ester-containing oil is present in an amount from 10 to 65 parts by weight, and wherein the one or more of starch and thermoplastic starch is present in an amount from 2 to 40 parts by weight.

13. A thermoplastic elastomer composition, comprising:
a styrenic block copolymer comprising at least one controlled distribution copolymer block having a conjugated diene and a mono alkenyl arene;
a biorenewable softener comprising an ester-containing oil;
a high molecular weight styrenic block copolymer having a number average molecular weight greater than 300,000 g/mol; and
a biorenewable polar polymer in an amount from 1 to 80 parts by weight based on 100 parts by weight of the composition, wherein the composition further includes one or more of starch and thermoplastic starch in an amount from about 2 parts to about 80 parts by weight based on 100 parts by weight of the composition, wherein a dispersion aid is present in an amount from about 1 to about 80 parts by weight based on 100 total parts by weight of starch and thermoplastic starch, and wherein a polyolefin is also present.

14. The composition according to claim 13, wherein the styrenic block copolymer having the controlled distribution copolymer block is present in an amount from 5 to 90 parts by weight, wherein the ester-containing oil is present in an amount from about 5 to about 75 parts by weight and wherein the composition further includes a functionalized styrenic block copolymer.

15. The composition according to claim 14, wherein the styrenic block copolymer having the controlled distribution copolymer block is present in an amount from 20 to 35 parts by weight, wherein the ester-containing oil is present in an amount from 10 to 65 parts by weight, and wherein the one or more of starch and thermoplastic starch is present in an amount from 2 to 40 parts by weight.

16. The composition according to claim 13, wherein the biorenewable polar polymer is one or more of a polylactic acid, polylactide, poly(glycolic acid), polyglycolide, poly(lactic-co-glycolic), poly(lactide-co-glycolide), polyglyconate, poly(hydroxyalkanoate), polyorthoester, polycaprolactone, polydioxanone, polyanhydride, and polyether-block-amide.

17. The composition according to claim 16, wherein the styrenic block copolymer having the controlled distribution copolymer block is present in an amount from 5 to 90 parts by weight based on 100 parts by weight of the composition, wherein the biorenewable polar polymer is present in an amount from about 2 to about 60 parts by weight, and wherein the composition is free of mineral oil.

18. The composition according to claim 17, wherein the biorenewable polar polymer is present in an amount from about 2 parts to about 60 parts by weight, and wherein the ester-containing oil is present in an amount from about 10 parts to about 65 parts by weight, and wherein the composition is free of a mineral oil.

* * * * *